United States Patent
Lyckfeldt et al.

(10) Patent No.: US 11,426,934 B2
(45) Date of Patent: Aug. 30, 2022

(54) SLOT DIE ADDITIVE MANUFACTURING APPARATUS AND MANUFACTURING METHOD

(71) Applicant: Digital Metal AB, Höganäs (SE)

(72) Inventors: Ola Lyckfeldt, Mölndal (SE); Emil Johansson, Askim (SE); Thorbjörn Åklint, Gothenburg (SE); Urban Harrysson, Gothenburg (SE)

(73) Assignee: DIGITAL METAL AB, Höganäs (SE)

( * ) Notice: Subject to any disclaimer, the term of this patent is extended or adjusted under 35 U.S.C. 154(b) by 688 days.

(21) Appl. No.: 16/307,386

(22) PCT Filed: May 17, 2017

(86) PCT No.: PCT/EP2017/061820
§ 371 (c)(1),
(2) Date: Dec. 5, 2018

(87) PCT Pub. No.: WO2017/215870
PCT Pub. Date: Dec. 21, 2017

(65) Prior Publication Data
US 2019/0308370 A1    Oct. 10, 2019

(30) Foreign Application Priority Data
Jun. 13, 2016  (GB) ................................. 1610267

(51) Int. Cl.
*B29C 64/209* (2017.01)
*B33Y 10/00* (2015.01)
(Continued)

(52) U.S. Cl.
CPC ............ *B29C 64/209* (2017.08); *B22F 10/10* (2021.01); *B29C 64/135* (2017.08); *B29C 64/20* (2017.08);
(Continued)

(58) Field of Classification Search
None
See application file for complete search history.

(56) References Cited

U.S. PATENT DOCUMENTS 5,234,330 A * 8/1993 Billow ............... B05C 5/0254
425/467
5,573,721 A * 11/1996 Gillette .............. B33Y 10/00
264/401
(Continued)

FOREIGN PATENT DOCUMENTS

CN      100448649 C    1/2009
EP        2955004 A1   12/2015
(Continued)

OTHER PUBLICATIONS

International Search Report and Written Opinion; dated Aug. 30, 2017; 12 pages.
(Continued)

*Primary Examiner* — Mohammad M Ameen
(74) *Attorney, Agent, or Firm* — Lowe Graham Jones PLLC

(57) ABSTRACT

An apparatus is provided which extrudes a radiation-curable construction material above a support surface with a slot die to deposit a layer of extruded construction material above the support surface. Radiation is selectively projected with a projection unit to a construction region between the support surface and the slot die, thereby curing portions of the extruded construction material. The apparatus repeats these steps are repeated until a desired object is formed by the contiguous cured portions of the construction material extending across and between the layers.

59 Claims, 12 Drawing Sheets

(51) Int. Cl.
*B33Y 30/00* (2015.01)
*B33Y 40/00* (2020.01)
*B33Y 50/02* (2015.01)
*B33Y 70/00* (2020.01)
*B29C 64/393* (2017.01)
*B29C 64/135* (2017.01)
*B29C 64/268* (2017.01)
*B29C 64/371* (2017.01)
*B29C 64/20* (2017.01)
*B22F 10/10* (2021.01)
*B29K 505/00* (2006.01)
*B29K 509/04* (2006.01)

(52) U.S. Cl.
CPC .......... *B29C 64/268* (2017.08); *B29C 64/371* (2017.08); *B29C 64/393* (2017.08); *B33Y 10/00* (2014.12); *B33Y 30/00* (2014.12); *B33Y 40/00* (2014.12); *B33Y 50/02* (2014.12); *B33Y 70/00* (2014.12); *B22F 2999/00* (2013.01); *B29K 2505/00* (2013.01); *B29K 2509/04* (2013.01)

(56) References Cited

U.S. PATENT DOCUMENTS

| | | | |
|---|---|---|---|
| 7,722,802 B2* | 5/2010 | Pfeifer | B22F 10/20 419/7 |
| 8,355,809 B2* | 1/2013 | Yapel | B29C 48/2515 29/527.2 |
| 2002/0111707 A1 | 8/2002 | Li et al. | |
| 2008/0260945 A1 | 10/2008 | Ederer et al. | |
| 2012/0203365 A1 | 8/2012 | Hümmeler et al. | |
| 2014/0265032 A1* | 9/2014 | Teicher | B29C 64/112 264/401 |
| 2014/0265045 A1* | 9/2014 | Cullen | B29C 64/357 264/497 |
| 2015/0035209 A1 | 2/2015 | Shah et al. | |
| 2016/0039152 A1* | 2/2016 | Hara | B33Y 10/00 264/308 |
| 2016/0046081 A1 | 2/2016 | Kim et al. | |
| 2016/0067928 A1 | 3/2016 | Mark et al. | |

FOREIGN PATENT DOCUMENTS

| | | | | |
|---|---|---|---|---|
| JP | 2007-522927 A | 8/2007 | | |
| WO | 1992/17329 A1 | 10/1992 | | |
| WO | 9217329 | 10/1992 | | |
| WO | WO-92/17329 | * 10/1992 | | |
| WO | WO 92-17329 A1 | * 10/1992 | ........... | B29C 64/135 |
| WO | 2003016030 A1 | 2/2003 | | |
| WO | 2012053895 A1 | 4/2012 | | |
| WO | 2013030064 A1 | 3/2013 | | |
| WO | 2016008876 A1 | 1/2016 | | |
| WO | 2016077250 A1 | 5/2016 | | |

OTHER PUBLICATIONS

Office Action dated May 25, 2021 for co-pending Japanese Application No. 2018-564949; 4 pages. All pages relevant.
UKIPO Search Report dated Oct. 31, 2016 for UK Application No. GB1610267.5; 5 pages.
Office Action and Search Report dated Aug. 21, 2020 for co-pending Russian Application No. 2019100316; 15 pages. All pages relevant.
Office Action dated Sep. 7, 2020 for co-pending Taiwan Application No. 106118025; 42 pages. All pages relevant.

* cited by examiner

SLOT DIE ADDITIVE MANUFACTURING APPARATUS AND MANUFACTURING METHOD

FIELD OF THE INVENTION

The present invention relates to an apparatus and method for additive manufacturing, and particularly to a method and apparatus that are able to form one or more desired objects by radiation-induced curing of a viscous medium, especially a viscous medium which is a suspension of fine particles in a radiation-curable liquid phase.

BACKGROUND

Additive manufacturing involves the manufacture of objects by successive addition of material to a partly-formed object. This is contrast to subtractive manufacturing, in which portions of a bulk material are removed until the object is formed.

Additive manufacturing has the possibility to allow cost-effective construction of high-precision or bespoke parts, and also allows the manufacturing in one piece of geometries which cannot be achieved readily by conventional subtractive manufacturing techniques.

In many modes of additive manufacturing, an object is formed by successively depositing layers of a construction material one on another, and binding portions of each deposited layer together as well as binding those portions with previously-bound portions of a layer immediately below. The object is formed by the contiguously-bound regions extending through the layers. Unbound portions of the layers can then be removed by appropriate techniques.

Examples of such additive manufacturing technologies include inkjet head and powder bed 3D printing, selective laser sintering, and fused deposition modelling.

In such techniques, bound portions of a particular upper layer are typically supported by both bound and unbound portions of layers arranged below that upper layer. This restricts the materials and techniques that may be used in additive manufacturing, as well as the geometries of parts that can be found.

It has been proposed to overcome these problems to form, in addition to the intended object to be manufactured, support portions formed by bound regions of layers which underlie portions of the object. Such support portions may be connected to or separated from the object.

However, such approaches can increase material consumption, can increase manufacturing time, and can make more difficult the production of parts having particular geometries.

Accordingly, there is a need for an additive manufacturing technology which overcomes these problems.

For example, in one previously-proposed additive manufacturing technology, objects are manufactured by successively depositing layers of a radiation-curable liquid into a well and selectively curing portions of each layer by selective application of radiation to the layer to form the object. However, in such a technique, the cured portions of each layer are supported, at least in part, by uncured portions of the layers below. Since liquid media have a tendency to flow, the support provided by such uncured portions may be insufficient, and distortion in the manufactured object may occur. To avoid such distortions, it is often necessary to include in the printed object support portions formed by cured liquid which must then be discarded from the finished object, leading to the disadvantages noted above.

It has also been proposed to use a modification of such a technique to manufacture ceramic or metallic components from a fine powder by suspending the powder as a suspension (or colloid) in a curable liquid medium, by forming an object by a liquid-based additive manufacturing process using that liquid medium as the construction material, and then by sintering the manufactured object resulting from the liquid-phase process.

However, such techniques as note above typically cannot provide adequate support of the manufactured object by the liquid phase during manufacturing. Particularly, depositing layers of a relatively viscous suspension of metallic or ceramic particles in a radiation-curable liquid binder is difficult to achieve without applying undesired shear forces to previously-deposited layers, since deposition of a viscous liquid by, for example, a moving deposition head tends to drag lower layers in the direction of movement of the deposition head.

Accordingly, there is a need for an additive manufacturing apparatus and method which allows the deposition of layers of a radiation-curable liquid while permitting the manufacturing of objects of complex geometries, with increased manufacturing speed and/or with reduced material wastage.

There is also a need for a liquid-phase 3D manufacturing technology which can achieve such advantages even with a suspension of particles in a curable liquid-phase which allows at least some of the indicated advantages to be achieved.

SUMMARY

The present inventors have recognised, inter alia, that deposition of a relatively viscous liquid construction material via a slot die can advantageously allow some of the above-indicated advantages to be achieved.

Accordingly, in light of this realisation, the present disclosure provides, in a first aspect, an additive manufacturing apparatus. The additive manufacturing apparatus is suitable for sequentially depositing layers of a viscous construction material to form an object. The apparatus comprises a support surface. The support surface is suitable for supporting the object during formation. The apparatus comprises a slot die. The slot die has an internal cavity. The cavity is suitable for accommodating construction material. The cavity communicates with a slot formed in a lower surface of the slot die. The slot is suitable for extruding the construction material from the internal cavity. The apparatus comprises a carriage. The carriage supports the slot die. The carriage is arranged to allow movement of a slot die across and above a support surface in a movement direction. The movement is for depositing a layer of extruded construction material onto the support surface. The apparatus comprises a drive mechanism. The drive mechanism is arranged to drive the movement of a carriage in a movement direction. The apparatus comprises a projection unit. The projection unit is for selectively projecting radiation to a construction region. The construction region is located between the support surface and the slot die. The projection of radiation is for defining regions of the extruded layer forming part of the object. The apparatus comprises a controller. The controller is configured to control at least the drive mechanism. In the apparatus, the slot die and the support surface are relatively moveable. The relative movement of the slot die and the support surface is in a separation direction between the slot die and the support surface. The relative movement is to allow deposition of sequential layers of construction material one on another.

In one embodiment, the slot die is provided with a heating unit. The heating unit is for heating at least a portion of the slot die which defines the slot.

In one embodiment, the slot is defined by two slot halves. The slot die is provided with a vibrator. The vibrator is suitable for vibrating edges of the slot relative to one another.

In on embodiment, the apparatus is provided with a cooling unit. The cooling unit is suitable for removing heat from the construction region.

In one embodiment, the cooling unit comprises at least one gas supply port. The at least one gas supply port is connectable to a gas source. The at least one gas supply port is arranged to blow the gas towards the construction region.

In one embodiment, the slot is oriented in a slot orientation direction. The movement direction is perpendicular to the slot orientation direction.

In one embodiment, the separation direction is perpendicular to each of the slot orientation direction and the movement direction.

In one embodiment, the support surface is flat. The support surface defines a plane perpendicular to the separation direction.

In one embodiment, the plane is parallel to the slot orientation direction. The plane is parallel to the movement direction. In one embodiment, the apparatus comprises a pump. The pump is connectable to a reservoir of construction material. The slot die has an inlet port. The inlet port is connected to the pump. The connection is such the construction material from the reservoir can be extruded under pressure from the pump via the slot.

In one embodiment, the controller is configured to control the pump. The control is so as to cause construction material to be extruded at a predetermined rate.

In one embodiment, the controller is configured to control the volume rate of extrusion and the rate of movement of the carriage. The volume rate of extrusion and the rate of movement of a carriage are controlled in proportionality with one another.

In one embodiment, the controller is configured to control the linear rate of extrusion and the rate of movement of the carriage. The linear rate of extrusion and the rate of movement of the carriage are controlled to be equal to one another.

In one embodiment, a projection unit comprises a radiation source. The radiation source is suitable for generating a radiation beam. The projection unit comprises a patterning unit. The patterning unit is illuminated by the radiation beam. The illumination is such as to be suitable for patterning the radiation beam. The projection unit comprises projection optics. The projection optics are suitable for projecting an image of the pattern onto a plane. The plane is defined between the support surface and the slot die. The projection is so as to selectively apply radiation to the plane. The selective application of radiation to the plane is accordingly based on the patterning of the radiation beam by the patterning unit.

In one embodiment, the patterning unit is a spatial light modulator.

In one embodiment, the patterning unit is a digital light processor.

In one embodiment, the projection unit comprises a radiation source. The radiation source is suitable for generating a radiation beam. The projection unit comprises scanning optics. The scanning optics are suitable for scanning the radiation beam across a plane. The plane is defined between the support surface and the slot die.

In one embodiment, the radiation beam is an intermittent radiation beam and the scanning so as to selectively apply radiation to the plane as a raster image.

In one embodiment, the scanning is so as to selectively apply radiation to the plane as a vector image.

In one embodiment, the radiation of the radiation beam is an electron beam.

In one embodiment, the radiation of the radiation beam is ultraviolet light or visible light.

In one embodiment, the apparatus comprises a well. The apparatus comprises an elevator mechanism. The support surface is movable in the separation direction into the well. The movement is by means of the elevator mechanism.

In one embodiment, the well has an internal wall. The support surface is provided with an edge seal. The edge seal is configured to seal against the internal wall.

In one embodiment, a top of the well is surrounded by an inclined surface. The inclined surface is inclined downward away from the top of the well.

In one embodiment, the support surface is provided with one or more cooling elements. The cooling elements are suitable for removing heat from the support surface.

In one embodiment, the well is provided with one or more cooling elements. The one or more cooling elements are for cooling the walls of the well. In one embodiment, the one or more cooling elements comprise channels. The channels are connectable to a coolant source. The channels are arranged to carry a coolant.

In one embodiment, the one or more cooling elements comprises a thermoelectric cooler.

In one embodiment, the well has a constant cross-section. The support surface has a shape corresponding to the cross-section of the well.

In one embodiment, the well is rectangular.

In one embodiment, the control unit is configured to control the projection unit. The control is in accordance with the drive mechanism. The control is so as to project a series of different partial images for each movement of the carriage across the support surface. Each partial image overlaps with one or more other partial images.

In one embodiment, the control unit is configured to control the projection unit. The control is such that each partial image comprises isolated pixels. The isolated pixels are connected by other partial images of the plurality of partial images, when the partial images are overlapped. In one embodiment, the control unit is configured to control the projection unit. The control is such that each of the partial images has a pattern. The pattern is a pattern which combines with one or more patterns of the remainder of the plurality of images to form a uniformly irradiated area.

In one embodiment, the pattern is a pseudo random pattern.

In one embodiment, the construction material is a liquid medium. The liquid medium is radiation-curable.

In one embodiment, the liquid medium is polymerizable.

In one embodiment, the particulate material is a ceramic.

In one embodiment, the ceramic is a nitride.

In one embodiment, the ceramic is an oxide.

In one embodiment, the ceramic is a carbide.

In one embodiment, the radiation-curable liquid medium is ultraviolet light curable or visible light curable.

In one embodiment, the radiation-curable liquid medium is electron beam curable.

In one embodiment, the particulate material is a metal powder.

In one embodiment, the particulate material has a mean diameter of less than 5 micron.

In one embodiment, the particulate material has a mean diameter of less than 2 micron.

In one embodiment, the projection unit is configured to project images with a resolution of better than 10 microns.

In one embodiment, the projection unit is supported by a further carriage. The further carriage is arranged to allow movement of a projection position of the projection unit. The movement is across and above the support surface in the movement direction and a cross-direction. The cross-direction is perpendicular to the movement direction. The apparatus comprises a further drive mechanism. The further drive mechanism is arranged to drive the movement of a further carriage in the movement direction and the cross-direction.

In one embodiment, the apparatus further comprises a gas hood. The gas hood is for supplying a gas to a projection region of the projection unit of the gas layer.

In one embodiment, the gas hood is suspended from the projection unit.

In one embodiment, the gas hood is retractable away from the support surface.

In one embodiment, the gas hood is arranged to substantially surround at least a portion of the radiation projected from the projection unit.

In one embodiment, the gas hood has a lower opening. The lower opening is arranged to face the projection region.

In one embodiment, the gas hood has an upper opening. The upper opening is for allowing the radiation projected from the projection unit to pass.

In one embodiment, the upper opening is provided with a radiation-transparent plate.

In one embodiment, an upper portion of the gas hood is radiation transparent for allowing the radiation projected from the projection unit to pass.

In one embodiment, the gas hood is configured to supply an inert gas.

In one embodiment, the gas hood is configured to supply a cooling gas.

In a further aspect, the present disclosure provides a method of forming an object. The formation of the object is from sequentially deposited layers of a construction material. The method comprises repeatedly forming a series of steps. The steps include extruding a radiation curable construction material above a support surface of a slot die while relatively moving the slot die above and across the support surface in a movement direction to deposit a layer of construed construction material above the support surface. The steps include selectively projecting radiation to a construction region between the support surface and the slot die, thereby curing portions of the extruded construction material to define regions of the extruded layer forming part of the object. The steps include relatively moving the slot die and the support surface in a separation direction between the slot die and the support surface.

In one implementation, the viscous construction material is a suspension of a particulate material in a radiation-curable liquid medium In one implementation, the particulate material is a ceramic or a metal powder.

In one implementation, the liquid medium is radiation-curable to form a polymer.

In one implementation, the particulate material has a mean diameter of less than 5 micron, optionally less than 2 micron.

In one implementation, the radiation is ultraviolet radiation, visible light radiation or electron beam radiation.

The method may be performed with the apparatus of the first aspect, and may apply features of any disclosed embodiment.

BRIEF DESCRIPTION OF THE DRAWINGS

For a better understanding of the present invention, and to show how the same may be carried into effect, reference will be made, by way of example only, to the accompanying drawings, in which.

DETAILED DESCRIPTION

Figure 1:
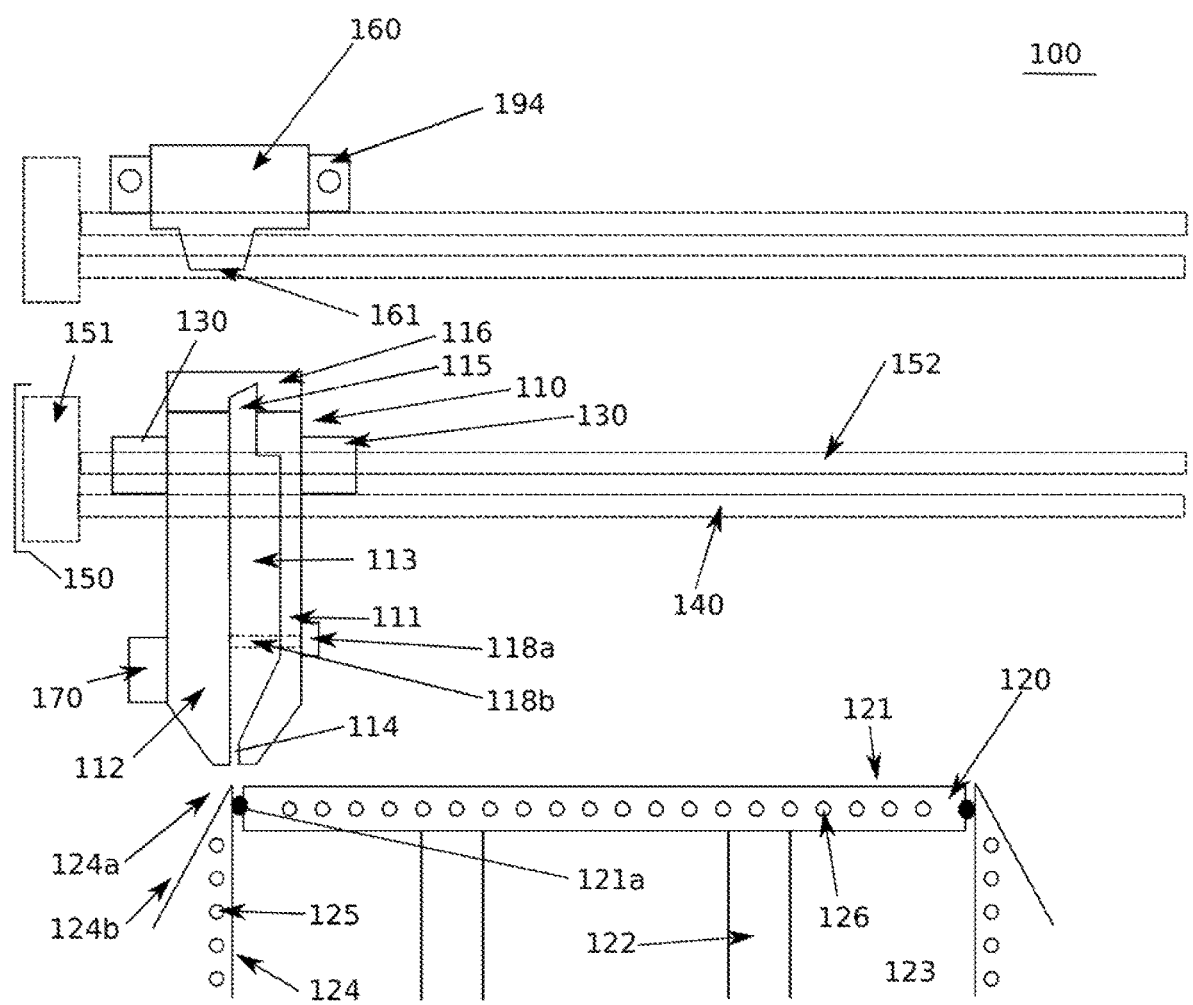
FIG. 1 shows a vertical cross-section of an additive manufacturing apparatus in accordance with the present disclosure.

FIG. 1 shows an additive manufacturing apparatus implementing principles of the present disclosure.

In FIG. 1, additive manufacturing apparatus 100 includes slot die 110 suspended above build platform 120. Build platform is accommodated in well 124. Slot die 110 is moveable in a first direction (X) running from left to right on the drawing by slot die carriage 130.

Slot die carriage 130 is supported on slot die carriage guide 140. Slot die carriage guide 140 runs in the (X) direction and provides a bearing surface on which slot die carriage 130 is arranged to slide. For example, slot die carriage guide 140 may provide a flat upper surface which cooperates with roller bearings provided in a lower surface of slot die carriage 130 to allow sliding movement of slot die carriage 130 relative to slot die carriage guide 140. Alternatively, other bearings such as flat siding bearings, air bearings, or other bearings as are known in the art may be applied.

Slot die carriage guide 140 is separated in a direction (Y direction) perpendicular to the direction of movement of the slot die carriage 130 from slot die 110, and slot die carriage 130 extends in this direction (Y direction) to allow slot die 110, supported on slot die carriage 130, to cross the slot die carriage guide 140 in a direction perpendicular to the movement direction of the slot die (X direction) and the separation direction of the slot die from the slot die carriage guide (Y direction).

Figure 2:
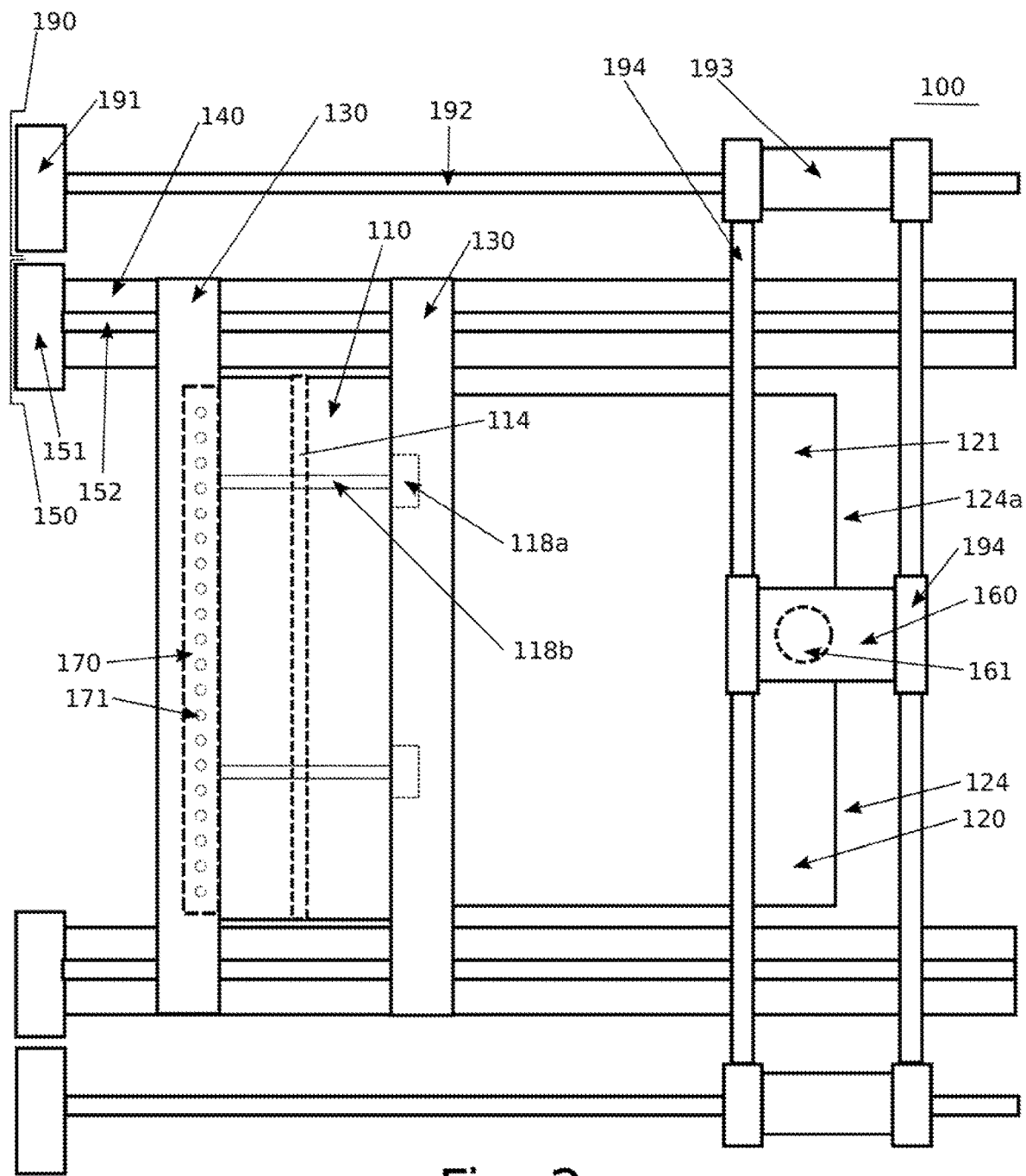
FIG. 2 shows a plan view of the additive manufacturing apparatus shown in FIG. 1.

This configuration may more easily be seen with reference to FIG. 2, which is a plan view of the apparatus depicted in FIG. 1. In FIG. 2, it can be seen that two slot die carriage guides 140 are provided, separated one from another (in the Y direction), supporting slot die carriage 130 between them. Of course, in alternative embodiments, only one slot die carriage guide 140, for example, need be provided, although providing a two slot die carriage guides 140 arranged on both sides of slot die 110 in a direction perpendicular to the direction of movement of the slot die 110 may improve the stability of the apparatus.

It can also be seen from FIG. 2 that slot die carriage 130 is provided to have two slot die carriage portions arranged on either side of the slot die 110 into the movement direction of the (X direction) of the slot die. Again, in alternative embodiments, only one slot die carriage portion need be provided, for example on one or other side of the slot die. However, providing a slot die carriage portion on both sides of the slot die 110 in the direction of movement of the slot die can improve the stability of the apparatus. In some embodiments, for example, the slot die carriage 130 may be integral with the slot die 110, or in other words, slot die 110 may be directly supported by slot die carriage guide 140, in which case slot die carriage guide 140 will function as a slot die guide rather than a slot die carriage guide.

Referring again to FIG. 1, slot die carriage 130 is moveable in the movement direction of slot die 110 (X direction) by a slot die carriage drive section 150. Slot die drive section 150 here comprises slot die carriage drive motor 151 which turns slot die carriage drive screw 152. Slot die carriage drive screw 152 itself is oriented in the slot die 110 movement direction (X direction) above and parallel to slot die carriage guide 140. Slot die carriage drive screw 152 cooperates with a cooperating thread formed in slot die carriage 130 such the rotation of slot die carriage drive screw 152 applies a force in slot die 110 movement direction (X direction) to move slot die carriage 130, supporting slot die 110, in the slot die 110 movement direction (X direction). Reverse rotation of slot die carriage drive screw 152 by slot die carriage drive motor 151 allows retraction of slot die 110 in the reverse direction (negative X direction).

As shown in FIG. 2, a corresponding slot die carriage drive motor 151 and a corresponding slot die carriage drive screw 152 are arranged in a similar manner above slot die carriage guide 140. This dual-drive configuration can contribute to stable movement of slot die 110.

However, in other embodiments, no such second slot die carriage drive means including a second slot die carriage drive motor and a second slot die carriage drive screw need be provided. In further embodiments, in place of the second slot die carriage drive motor and slot die carriage drive screw, a simple support rail having, for example, a bearing for supporting slot die carriage 130 may be provided.

In yet further alternative embodiments, if slot die carriage drive screw 152 and second slot die carriage drive screw (or support rail as appropriate) can fully bear the weight of slot die 110 and slot die carriage 130, it may be possible to omit the separate slot die carriage guides 140.

Also shown in FIG. 1 is gas supply unit 170. Gas supply unit 170 is arranged on one side of slot die 110 in the movement direction (X direction) of slot die 110. In the present embodiment, gas supply unit 170 is arranged a trailing side of slot die 110 relative to the movement direction (X direction) of slot die 110. Alternatively, gas supply unit 170 may be arranged on a leading side of slot die 110 in the slot die movement direction (X direction). Gas supply unit 170 has one or more gas supply ports 171 formed in a lower surface of the gas supply unit 170 and thus arranged to face build platform 120.

The configuration of gas supply unit 170 can be seen also in plan view in FIG. 2, in which it is shown that gas supply unit 170 has a plurality of gas supply ports 171 arranged to face build platform 120.

In an alternative configuration, a single gas supply port may be provided extending across the area covered, for example, by gas supply ports 171 in FIG. 2.

Each gas supply port may be provided with a porous member, such as a porous ceramic plate, to diffuse the flow of gas. Such a configuration may avoid the force of a gas jet disturbing material deposited from the slot die.

Gas supply unit 170 is connected to a gas supply (not shown) which may be provided in the apparatus or which may be provided as a service to the apparatus, for example as a compressed air line or dry nitrogen line provided at the facility in which the apparatus 110 is installed.

As gas supply unit 170 is fixed on slot die 110, gas supply unit 110 moves together with slot die 110 when driven by slot drive carriage drive section 150 in the movement direction (X direction) of slot die 110. Alternatively, in various embodiments, gas supply unit 170 could be provided on its own independent carriage.

Also shown in FIG. 1 is projection unit 160. Projection unit 160 is provided above slot die 110 and is also arranged for movement above build platform 120 in a first direction (X direction) which, in the configuration as shown in FIG. 1, coincides with the movement direction (X direction) of slot die 110. Projection unit 160 is supported by projection unit carriage 194 which will, for reasons which will be apparent in the below, be hereinafter referred to as projection unit Y-drive carriage 194.

The support arrangements for projection unit 160 are most easily appreciated with reference to FIG. 2. Projection unit 160 is directly supported by projection unit Y-drive carriage 194, which is moveably mounted in a direction perpendicular to the movement direction (X direction) of slot die 110, which will be termed the cross-direction (Y direction).

In the embodiment of FIG. 1 (and FIG. 2), projection unit Y-drive carriage 194 contains a Y-drive motor (not shown) which cooperates with projection unit Y-drive rails 194 extending in the cross-direction (Y direction) above build platform 120, for example by means of a rack-and-pinion drive or other suitable drive as may be known in the art. For example, as an alternative, a belt drive or wheel-and-surface drive could equivalently be used to permit projection unit drive carriage 194 to be moveable in the cross-direction (Y direction) on projection unit Y-drive rails 194.

Projection unit Y-drive rails 194, of which in alternative embodiments only one need be provided, extend between projection unit X-drive carriages 193, which are arranged on either side in the cross-direction (Y direction) of projection unit 160.

Projection unit X-drive carriages 193 are each arranged to be moveable in the movement direction of slot die 110 (X-direction) on projection unit X-drive rails 192. This movement may be driven in a similar manner as the movement of projection unit Y-drive carriage 194 on projection unit Y-drive rails 194.

Projection unit X-drive rails 192 are supported by corresponding projection unit drive supports 191.

Projection unit drive supports 191, projection unit X-drive rails 192, projection unit X-drive carriage 193, projection unit Y-drive rail 194, and projection unit Y-drive carriage 194 together make up projection unit drive section 190.

Projection unit X-drive rail 192 rails 192 extend in the movement direction of slot die 110 (X direction) and are arranged outwardly relative to slot die carriage guides 140 relative to slot die 110.

Also, as shown in FIG. 1, projection unit drive section 190 and projection unit 160 are arranged above slot die carriage 130 and slot die 110. However, this arrangement is not mandatory, and other mounting configurations are possible achieving at least some of the same functionality. In particular, although projection unit drive section 190 has X-drive rail 192 and Y-drive rails 194 which are based on a corresponding coordinate system as slot die carriage drive section 150, in that projection unit 160 moves in a parallel plane to the movement plane of slot die 110, this is not mandatory. An alternative coordinate system may be used for movement of projection unit 160. For example, projection unit 160 could be supported by an alternative radial drive carriage arranged to move along a projection unit radial drive rail, which radial drive rail is then arranged to rotate about one end within a movement plane of projection unit 160 such that the position of projection unit 160 may be set in terms of polar coordinates, rather than Cartesian coordinates as shown in FIGS. 1 and 2.

Projection unit 160 has projection aperture 161 through which radiation, such as ultraviolet radiation, visible light radiation, or electron beam radiation, may be projected below projection unit 160. As a consequence of the movement arrangements for projection unit 160 provided by projection unit drive section 190, radiation may be projected from positions above a range of points on build platform 120, which range extends in two dimensions. Hence, radiation may be projected from positions within a predetermined area.

Similarly, as may most easily be seen with reference to FIG. 2, slot die 110 has slot 134 extending in the cross-direction (Y direction) and extending across and beyond the full width of build platform 120 in the cross-direction, such that by movement of slot die 110 in the movement direction (X direction), all points on build platform 120 may be arranged beneath slot 134.

As shown in FIG. 2, build platform 120 has a generally rectangular cross-section in the plane defined by upper build (X Y plane), which surface is generally flat and aligned with the movement direction (X direction) and cross-direction (Y direction) of slot die 110. However, in other embodiments, cross section of build platform 120 may be of another shape, for example square, circular, polygonal, or another shape as maybe required.

Also appreciable from FIG. 2 is that gas supply ports 171 of gas supply unit 170 are arranged, through movement of slot die 110 by slot die carriage drive section 150, as well as by the arrangement of gas supply ports 171 across the width direction (Y direction) of build platform 120, to be able to supply gas to substantially all locations on the surface of build platform 170.

Alternatively, gas supply unit 170 may not be movably mounted above well 124, but may be fixed in position relative to well 124 with gas supply port or gas supply ports arranged to provide cooling gas to substantially the entire open top region of well 124. For example, one or more gas supply ports could be arranged above and surrounding well 124 to direct cooling gas inwardly and downwardly to substantially the entire open top region of well 124 from a plurality of positions around well 124.

Also as shown in FIG. 1, build platform 121 is moveable, in particular retractable, relative to a direction (Z direction) perpendicular to build platform upper surface 121 by means of build platform elevators 122. Build platform elevators 122, as shown in FIG. 1, are formed as two columns arranged to extend in a direction (Z direction) normal to build platform upper surface 121 from build platform lower surface 123 and are coupled to drive units (not shown) which cause extension and retraction of build platform elevators 122.

Build platform 120 is located in well 124. Well 124 extends, from a top border 124a, with constant internal cross section, in a direction normal to build platform upper surface 121. The cross section of well 124 is the same as the cross section of build platform 120 in the direction (Z direction) normal to the build platform upper surface 121. This allows build platform 120 to be freely raised and lowered within the well by build platform elevators 122.

Seals 121a are provided bordering build platform 120 to seal between the edges of build platform 120 and the walls of well 124. Such seals can be provided, for example, by a continuous resilient bead, such as an O-ring, set into a groove formed around build platform 120. Alternatively, resilient wipers or other seals as known in the art may be provided.

It is noted that another configuration could be provided instead of that described above, wherein slot die 110 is gradually raised rather than build platform 120 being gradually lowered. This may be achieved with or without correspondingly raising walls of well 124 relative to build platform 120. However, the present configuration is considered particularly simple to construct.

Accordingly, slot die 110 and cooperating parts such as slot die carriage drive section 150, as well as well 124 are all supported by a main frame of apparatus 100 (not shown), which supports the apparatus on a stable surface such as a factory floor, and build platform 120 is retracted relative to this main frame.

As is visible in FIG. 1, top border 124a of well 124 is provided with an inclined surface 124b, which is inclined downwardly and away from top border 124a of well 124. As a consequence, any material which falls outside of the internal cross section of well 124 can flow, slide or roll under the influence of gravity down inclined surface 124b away from the working parts of the apparatus 100.

Also shown in FIG. 1 are well cooling elements 125, which are provided in the walls of well 124 to surround well 124. In one configuration, these well cooling elements 125 may be channels adapted to carry a cooling fluid from a cooling fluid source, such as a chiller, not shown. In another variant, well cooling elements 125 may be thermoelectric coolers such as a Peltier cooling elements or other cooling elements as may be available in the art. Well cooling elements 125 allow walls 124 of well to be cooled so as to remove heat from within the well.

Build platform 120 is also provided with cooling elements, in the form of platform cooling elements 126. Platform cooling elements 126 act to remove heat from a region above build platform upper surface 121. Platform cooling elements may be cooling elements of the same or different type as well as cooling elements 125. Platform cooling elements 126 are embedded in build platform 120. In some embodiments, platform cooling elements 126 are positioned a small distance beneath build platform upper surface 121.

The operation of slot die 110 will now be explained with reference to FIG. 3. Slot die 110 is principally formed of two portions, a first slot die portion 111 and a second slot die portion 112. Each of first slot die portion 111 and second slot die portion 112 is arranged in the cross-direction (Y direction) to extend the full width of slot die 110. First slot die portion 111 and second slot die portion 112 together cooperate to define slot die cavity 113, also running substantially the whole length of the slot die.

Slot die cavity 113 is closed at the cross-direction ends (Y-direction ends) by slot die cavity walls (not shown). Slot die cavity 113 opens at a top of slot die 110 with a slot die inlet port, which may not extend the full width across slot die 110 in the cross-direction (Y direction). Slot die cavity 113 opens at a bottom of slot die 110 at slot 114, which does extend substantially the entire width of slot die 110 in the cross-direction (Y direction). Slot 114 is thus highly elongate, being relatively long in the cross-direction but relatively narrow in the movement direction.

For example, to provide a narrow, elongate slot, slot 114 may be greater than 10 cm long, and may be narrower than 500 micron. In some configurations, the slot may be narrower than 300 micron, narrower than 250 micron, narrower than 200 micron, or narrower than 100 micron, in each case the width being measured perpendicular to an elongation direction of slot 114. In the present embodiment, the elongation direction of slot 114 corresponds to the cross-direction (Y direction). Slot 114 is thus oriented in the cross-direction (Y direction).

Of course, slot 114 may alternatively be angled with respect to the cross-direction. However, in certain embodiments, it is considered that the angle of the slot elongation direction to the movement direction (X direction) of the slot die 110 may be less than 20 degrees, less than 15 degrees, less than 10 degrees, or less than 5 degrees.

In some embodiments, the width of slot 114 may be adjustable. The adjustable width of slot 114 may be provided, for example, inserting additional shims (rigid spacers) between first slot die portion 111 and second slot die portion 112 to separate the slot die portions one from the other whilst maintaining the substantial integrity of slot die cavity 113.

Alternatively, resilient spacers may be provided, for example rubber caskets. With such a configuration, set-screws or adjustment bolts may be provided to apply a variable clamping force between first slot die portion 111 and second slot die portion 112 to compress the resilient spacers and bring the edges of slot 114 closer together, Conversely, reducing the clamping force would allow the edges of slot 114 to separate.

Slot die 110 is provided with a slot die channel formation member 116 which caps cavity 113 and allows communication between a channel formed in slot die channel formation member 116 and slot die inlet port 115. Liquid construction material may be pumped via a pump (not shown) successively through slot die channel formation member 116 and slot die inlet port 115 to fill slot die cavity 113.

Slot 114 is so narrow that, even when slot die cavity 113 is filled with a relatively viscous liquid, the liquid will tend not to leak through slot 114 by the action of surface tension at the slot 114. However, as more liquid is pumped via slot die channel formation member 116 and slot die inlet port 115 into slot die cavity 113, the pressure in slot die cavity 113 rises, and the material in slot die cavity 113 is then forced through slot 114.

For a certain category of liquid, in particular so-called shear-thinning liquids, the liquid exhibits a decrease in viscosity when subject to shear strain. Slot die 110 has inclined surface 111 which progressively narrows the cross-sectional area of slot die cavity 113 from the main portion of cavity 113 to slot 114. As the cross-sectional area of cavity 113 is progressively restricted, the fluid flowing from cavity 113 towards slot 114 tends to shear. Sheer-thinning fluids thus will particularly easily be dispensed through slot 114 under appropriately-increased pressure. This effect can be observed even without the presence of inclined surface 111, for example where the inclined surface 111 is approximated by one or more steps.

Under a suitably high pressure, even non-shear thinning fluids can successfully be dispensed through slot 114, despite having relatively high viscosity.

Typical pressures achievable in slot die cavity 113 include pressures in excess of, for example, 2 bar.

Slot die 110 is also provided with slot die heating elements 117, which are in the present embodiment arranged in the vicinity of slot 114. Slot die heating elements 117 provide heat to fluid in slot die cavity 113, especially to fluid approaching slot 114. Slot die heating elements 117 may, for example, be thermoelectric heating elements, resistive heating elements, or channels carrying a heating fluid such as hot water or hot oil supplied from a hot fluid source (not shown).

Although three such slot die heating elements 117 are shown on each half of slot die 110, being six in total, this is purely exemplary, and greater or fewer than this number can be provided, and in alternative arrangements. For example, such heating elements may be provided only on one or other side of slot die cavity 113.

In the present embodiment, the slot die heating elements 117 are provided approximately evenly spaced relative to the top and bottom of slot die cavity 113. Accordingly, slot die heating elements 117 are configured to apply heat to the full height of slot die cavity 113. In other embodiments, slot die heating elements 117 may be concentrated near the slot, or may be only provided near to slot 114, and may be less densely provided or even absent at positions relatively further from slot 114.

If slot die 110 is made of a material of relatively higher thermal conductivity, such as copper or aluminium, then relatively fewer slot die heating elements 117 may be provided as compared with the situation when slot die 110 is made of a material of relatively lower thermal conductivity, such as steel. In the latter situation, relatively more slot die heating elements 117 may be provided.

In some configurations, the exterior of slot die 110 may be insulated against heat loss to improve the efficiency of heating the slot die with the slot die heating elements 117.

Slot die heating elements 117 are able to raise the temperature of fluid in slot die cavity 113 to reduce its viscosity prior to extrusion via slot 114. Applying heat using slot die elements 117 therefore can both control the passage of fluid through the slot and can also reduce the pressure required to extrude material through slot 114 at a given rate.

In other embodiments, slot die heating elements 117 may be arranged throughout one or other of first slot die portion 111 and second slot die portion 112

Slot die 110 is also provided with slot die vibrator 118a, which is positioned on first slot die portion 111 and, by coupling to slot die vibrator drive rod 118b, is able to vibrate first slot die portion 111 relative to second slot die portion 112. In the present embodiment, slot die vibrator 118a applies alternating push and pull forces to slot die vibrator drive rod 118b, which alternately pushes apart and pulls together the edges of slot 114. Such vibration can be effected by mechanical means, for example by a rotating cam contacting an end of slot die vibrator 118b located within slot die vibrator 118a, electromagnetic means, for example by alternately driving a solenoid coupled to the end of slot die vibrator drive rod 118b located within slot die vibrator 118a, or by piezoelectric means, in which a piezoelectric element positioned in slot die vibrator 118*a* alternately pushes or pulls slot die vibrator drive rod 118*b*. Other vibration mechanisms are possible, including the positioning of vibrating blades at an excess of slot 114, or simply providing mechanical vibration to the entire slot die as a whole. Such vibration tends to break surface tension and permit material to be extruded more easily through slot 114.

Vibration, especially ultrasonic vibration, can also be used to induce thinning in certain fluids. In some variants slot die vibrator 118*a* may be adapted to provide high-frequency or ultrasonic vibrations to achieve this.

Actuation of slot die vibrator 118*a* may be used to reduce the pressure required to extrude fluid from slot die cavity 113 via slot 114, or to modify the mass rate at which such extrusion occurs.

A layer-deposition operation of apparatus 100 will now be explained using FIG. 3, with reference also to FIG. 1.

At the beginning of a layer-deposition operation of apparatus 100, slot die 110 is at a starting position such that slot 134 is positioned relatively to the left-hand side (negative Y direction side) of top border 124*a* of well 124. A desired construction liquid is pumped via pump (not shown) through slot die inlet port 115 to fill slot die cavity 113, and heating elements 117 and slot die vibrator 118*a* are activated. It is notable that, depending on the fluid and the desired deposition rate, slot die heating elements 117 and slot die vibrator 118*a* need not be actuated, or only one or other may be actuated. In some circumstances, it is sufficient to pump material to slot die cavity 113 and thereby to elevate pressure within slot die cavity 113 to achieve extrusion of construction material from slot die cavity 113 through slot 114.

Once extrusion of material starts, as a result of the position of slot 114 relative to well 124, the firstly-extruded material falls onto inclined surface 124*b* and, through the action of gravity, is carried away from the working parts of apparatus 100. Once extrusion has started, slot die carriage drive section 150 is actuated to advance slot die 110 at a controlled speed across build platform 120 until slot 114 is positioned at a right-most side (positive X direction side) of top border 124*a* of well 124.

Figure 3:
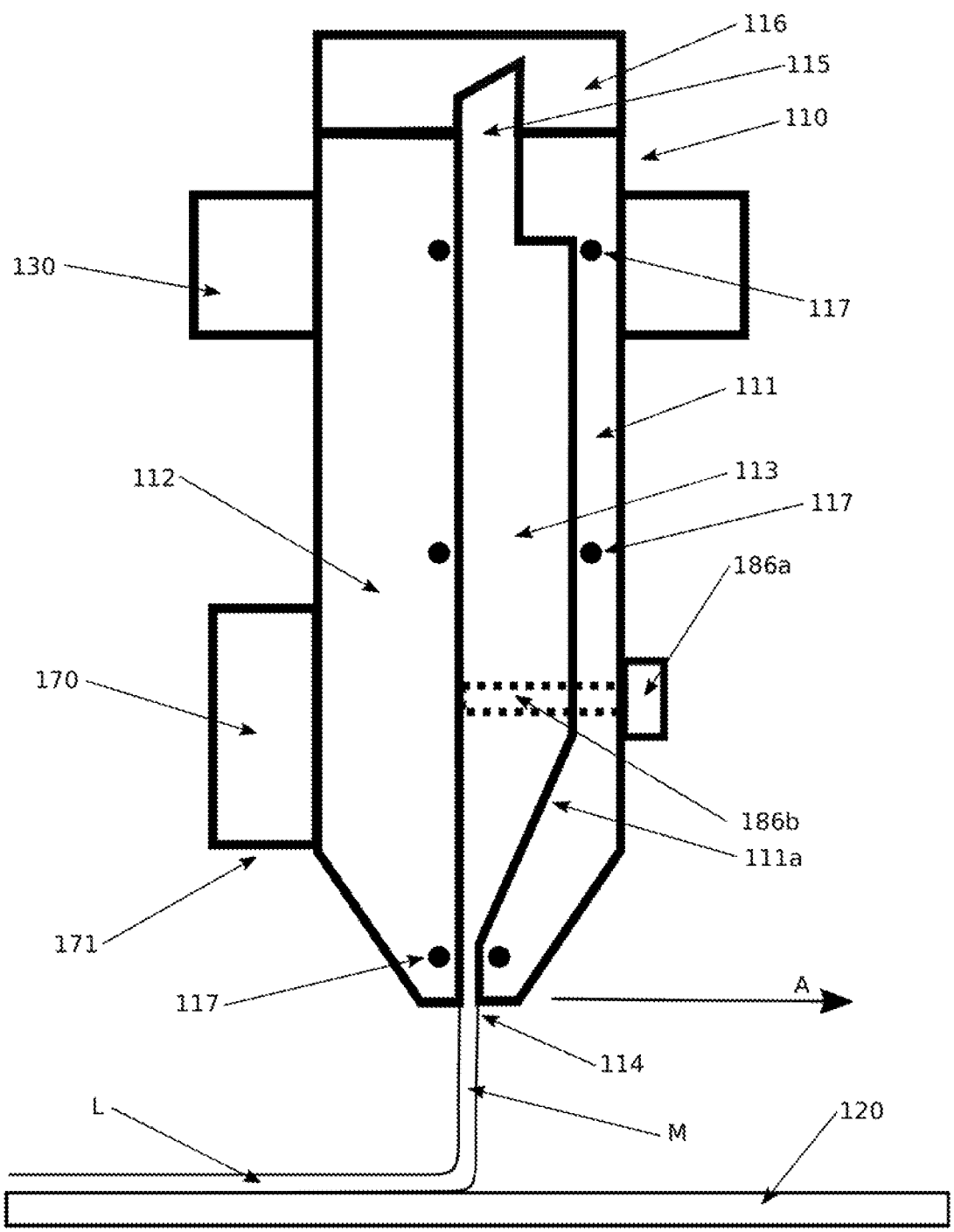
FIG. 3 shows a cross-section of a slot die of the additive manufacturing apparatus in an extrusion operation.

Now with reference to FIG. 3, as slot die 110 moves in direction A (which corresponds to the X direction in FIG. 1), extruded material M is deposited from slot 114 onto build platform 110 and forms deposited layer L.

The rate of extrusion of material M can be controlled in coordination with the movement of slot die 110 in direction A such that the linear extrusion rates of material M substantially corresponds to, or is substantially the same as, the speed of movement of slot die 110 in direction A. The effect of such a coordination is that material M is deposited as layer L onto build platform 120 in a way analogous to, for example, unrolling a carpet, such that no shear (or drag) force is applied to already-deposited parts of layer L or to build platform 120.

Once a single layer has been deposited, slot die 110 may be returned by slot die carriage drive section 150 to the initial (left-most, negative X direction) position, and a further layer may be deposited. Even for a relatively viscous deposited material M, a further layer L may be deposited on top of a previously-deposited layer L without applying substantial forces to the previously-deposited layer.

In FIG. 1 and FIG. 3, the spacing of slot 114 from platform 120 are exaggerated for ease of reference. In one embodiment, slot 114 may be spaced only a short distance above the top of well 124. For example, slot 114 may be arranged less than a millimetre, less than 500 micron, less than 300 micron, less than 200 micron or less than 100 micron above top of well 124.

Once a first layer has been deposited, in order to allow sufficient space for a further layer to be deposited, build platform 120 may be retracted a short distance, corresponding to the thickness of a layer L, by means of build platform elevators 122, before the next layer is deposited.

In some configurations, build platform 120 may already be retracted a short distance corresponding to the thickness of a first layer before the first layer is deposited, such that the walls of well 124 act to stabilise the first layer. In other configurations, each layer is deposited above the walls of the well, and the walls of well 124 then stabilise the layers as the layers descend into the well.

By such a process, several layers may be deposited in sequence, without the deposition of an upper layer applying forces to, and substantially without disturbing, previously-deposited layers.

In the layer-deposition process, the rate of extrusion may be selected to apply layers of thickness less than 250 micron, particularly less than 100 micron. In the present embodiment, the layers may not be of uniform thickness as between successive layers but a layer thickness may be varied as required.

The ability of such a process to avoid the deposition of uppermost layers disturbing previously-deposited layers may be enhanced by use of shear-thinning effects associated with the use of slot die vibrator 118*a*, or thermal effects associated with the use of slot die heating elements 117.

In particular, if the viscosity of the extruded material M shortly after extrusion is greater than the viscosity of material which has previously been deposited, the previously-deposited layer will be more resilient to any forces which are applied during the deposition of a further layer.

Referring now to FIG. 1, it may be understood that the use of well cooling elements 125 and/or platform cooling elements 126 may be advantageous in increasing the viscosity of previously-deposited layers, by cooling previously-deposited layers such that their viscosity increases. This approach can also contribute to the formation of a stable series of layers, undisturbed by the deposition of further layers L.

To this end, also, gas supply unit 170 may be actuated during the pass of slot die 110 across well 124 during the deposition operation to eject cooling gas through gas supply ports 171. Application of cooling gas through gas supply ports 171, which are directed toward well 124 as slot die 110 travels across well 124 in the slot die movement direction (X direction), can also provide an effect of rapidly cooling a layer while the layer is being deposited.

Alternatively, a material deposition pass of slot die 110 across well 124 in which no cooling is provided to the deposited material with gas supply unit 170 can be followed by a subsequent cooling pass of slit die 110 during which pass cooling gas is supplied via gas supply unit 170 and gas supply port 171. In the variant embodiment previously described, in which gas supply ports are arranged above and surrounding well 124 to direct cooling gas inwardly and downwardly to substantially the entire open top region of well 124 from a plurality of positions around well 124, a flow of cooling gas may continuously be provided.

Accordingly, several features of the disclosed apparatus 100 can enable the formation of a stable series of layers on build platform 120 as build platform 120 gradually descends into well 124.

Figure 4:
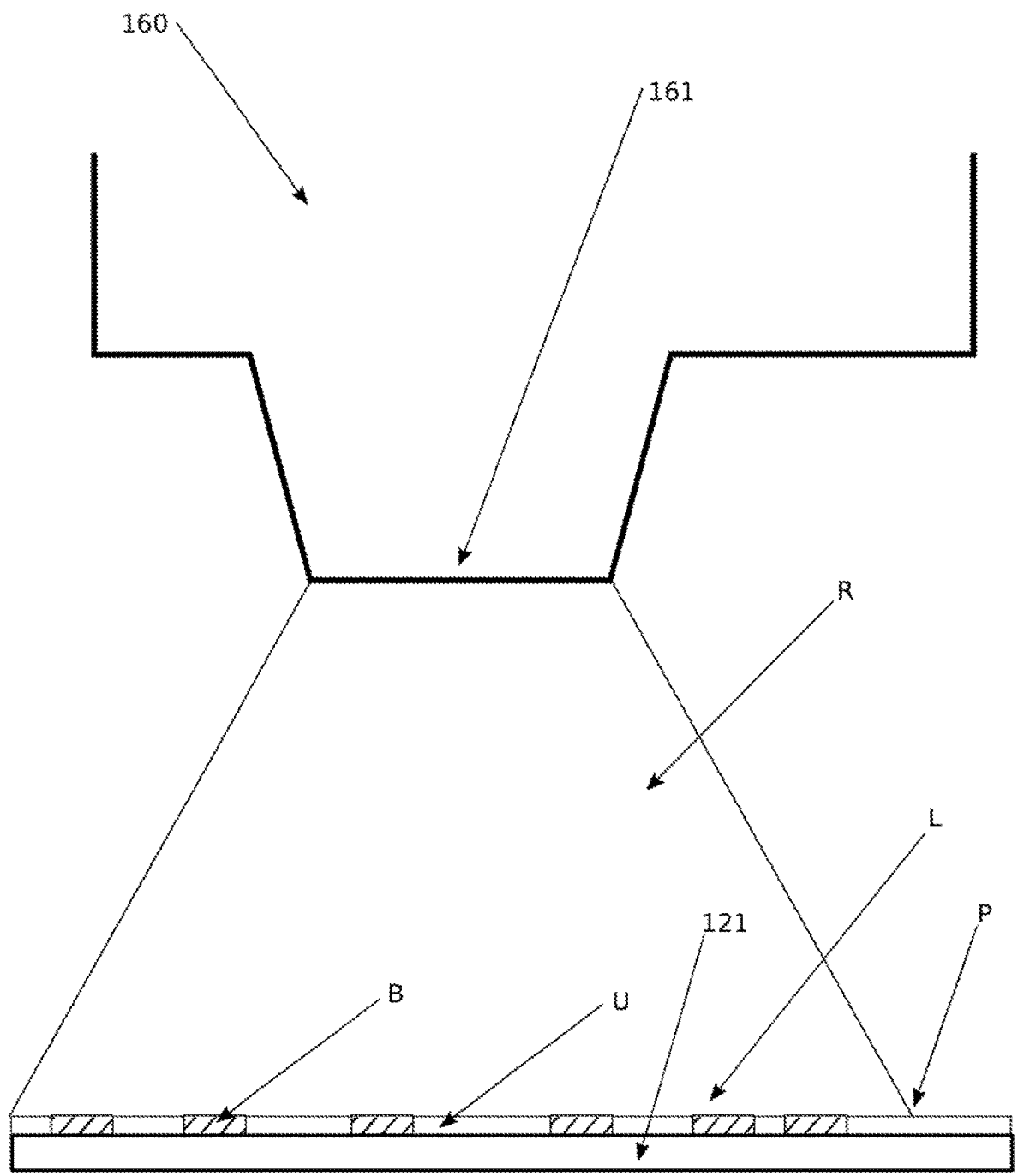
FIG. 4 shows a projection unit of the apparatus of FIG. 1 in a projection operation.

FIG. 4 explains the operation of projection unit 160. Projection unit 160 has a projection unit aperture 161 through which radiation beam R may be projected onto an image plane P. Image plane P corresponds to an image plane within the thickness of a deposited layer L, lying between slot 114 and build platform 120. Image plane P will normally correspond to a plane contained within mostly recently deposited layer L. In FIG. 4, layer L is shown deposited on build platform upper surface 121, in other words as the first layer. However, layer L shown in FIG. 4 could equally well be deposited on top of one or more previously-deposited layers, which, by application of the deposition process previously described, have not been substantially disturbed by the deposition of layer L.

In the discussion relating to FIG. 4, it is assumed that layer L is formed of a viscous liquid construction material M which may be cured to a solid state by the application of radiation R. Radiation R may, for example, be ultraviolet (UV) light. In other embodiments, radiation R may be extreme ultraviolet (EUV) light, x-ray radiation, gamma radiation, particle radiation such as electron beam radiation, infrared or thermal radiation, or visible light. The type of radiation is not particularly limited provided that it can be directed in a controlled manner to selectively irradiate the most recent-deposited layer L.

If radiation beam R were uniform in intensity across an illuminated region of layer L, the entirety of the illuminated region of layer L would become cured. However, in the configuration shown in FIG. 4, radiation beam R is selectively applied to certain regions B of layer L to cure only those certain regions, while leaving certain other regions U unbound. In the example of FIG. 4, radiation bean R is patterned, such that regions B receive a high dose of radiation, and regions U receive a relatively low dose of radiation, which may be no dose of radiation. Thus, only regions B are radiation-cured to a solid state, while unbound regions U remain in the liquid state. The intensity of radiation beam R may be adjusted such that the entire thickness of layer L is cured, and also a cured connection is made to previously-cured portions in an underlying layer, while any underlying layers remain substantially uncured.

Figure 5:
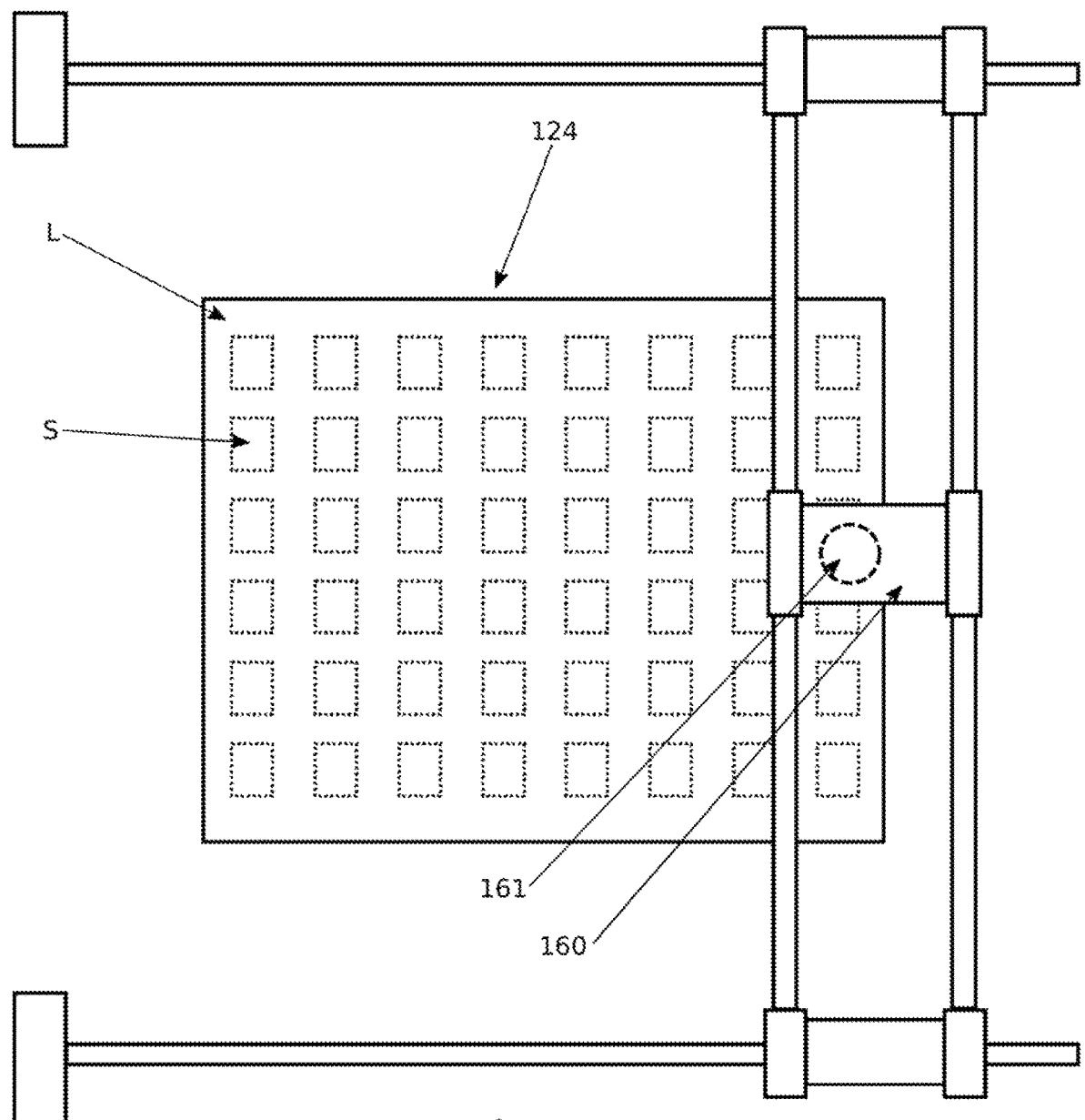
FIG. 5 shows a simplified plan view of the apparatus of FIG. 1 for explaining one mode of projection.

Since projection unit 160 is movable above well 124 in an entire plane lying above well 124 (XY plane) by the action of projection unit drive section 190, even though a projection region to which projection unit 160 can project radiation R at any given time may be much smaller than cross-sectional area of well 124, by moving projection unit 160 within its movement plane (XY plane) radiation R may be sequentially applied to a series of shot regions S on layer L within well 124, as shown in FIG. 5. Accordingly, any point on layer L within well 124 may be cured.

As shown in FIG. 5, the shot areas S may be regularly arranged and spaced in a grid or matrix formation. However this need not be the case.

In the configuration of FIG. 5, areas outside shot regions S remain unbound, and no part is larger in a cross-sectional dimension than a shot region S. Accordingly, each shot region S may correspond to a part to be manufactured, formed by bound regions of layer L together with bound regions of any layer below layer L. In such a configuration, the part may have a maximum length corresponding to depth of well 124, but cross-sectional dimensions within those of shot region S.

Figure 6:
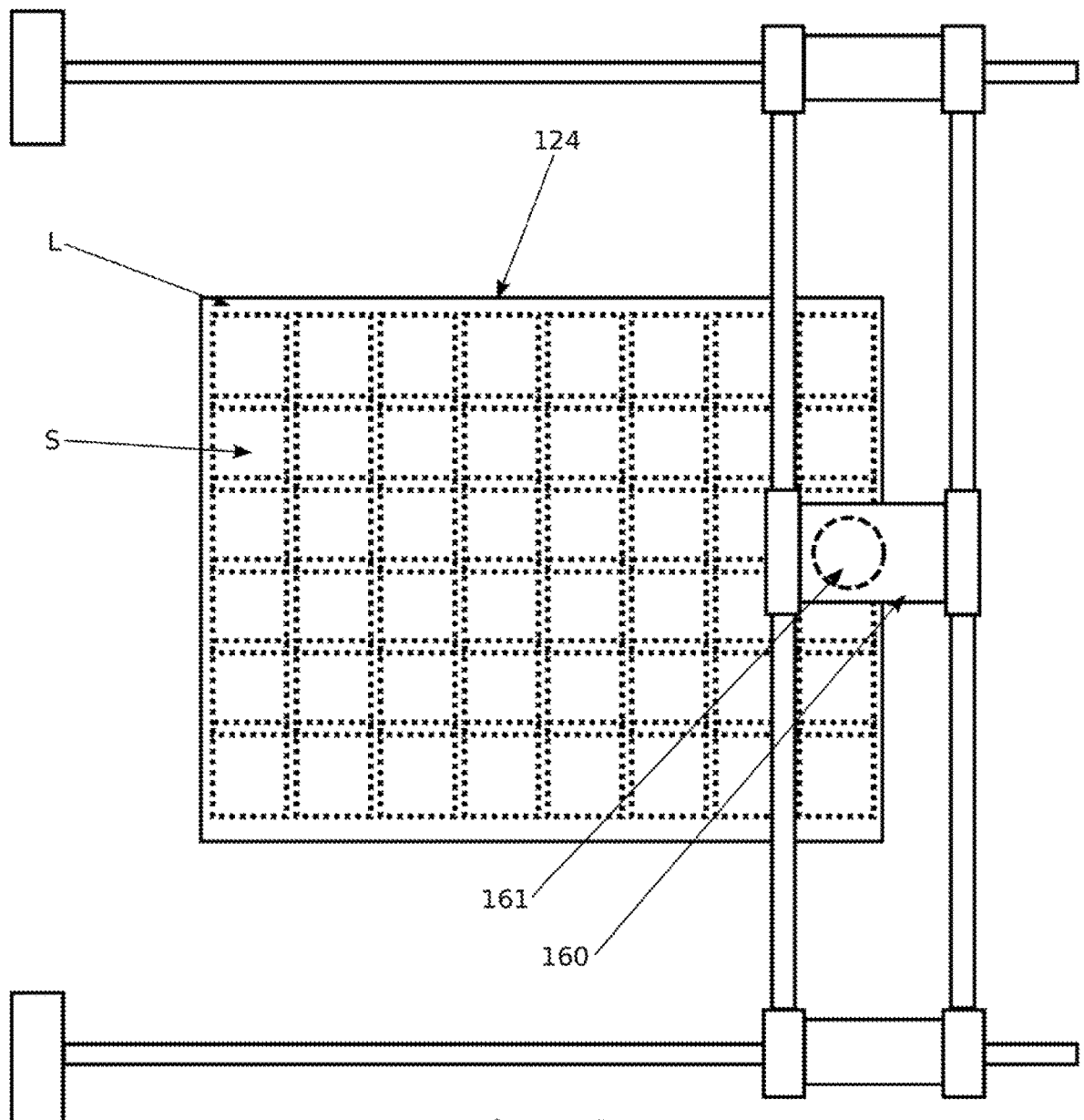
FIG. 6 shows a variant of FIG. 5 showing another mode of projection.

Alternatively, as shown in FIG. 6, shot regions may be partially overlapped or abutted in a step-and-stitch projection mode, wherein substantially the entirety of layer L may be exposed with radiation R. With such an approach, shot regions S may correspond to portions of an integral object having dimensions larger than those of an individual shot region S.

Considering the above-described configuration of projection unit 160 to be movable above well 124, it is also equivalently possible for only a projection position of the projection unit 160, such as projection aperture 161, which defines a point from which the radiation beam originates, to be movable above well 124. For example, a radiation source from which radiation R originates may be provided at a fixed location relative to well 124, or even external to apparatus 100. Radiation R may then be guided via suitable radiation guides, such as waveguides, optical fibres, mirrors or the like, to projection aperture 161 for projection. By suitable configuration of the guides, the radiation source and associated optical components may be fixed but the projection position from which the radiation is projected to layer L may be movable.

In a further variant, one or more of the guides may be movable in a path or along an axis either in the plane (XY plane) or other than other in the plane (XY plane) of movement of the projection position in order to bring the radiation from the source to the projection position. For example one or more of the guides may be movable in a perpendicular plane (the XZ plane or YZ plane), or along a parallel axis (X-axis, Y-axis) or perpendicular axis (Z-axis). In such a configuration, the guides may be movably located to one side of, or away from, a region above well 124 within which the projection position moves. The movable projection position may be defined by an optical element such as a projection lens or relay mirror.

It has been assumed when describing the apparatus in relation to FIGS. 1 to 6 that the projection unit 160 can only illuminate with accuracy a small shot region S. In other embodiments, it may be provided that projection unit 160 is able to illuminate the entirety of or substantially the entirety of layer L without moving, for example from a central illumination position, which central illumination position may be above a centre of well 124. In such a configuration, projection unit 160 may be fixed relative to an apparatus main frame, and then projection unit drive section 190 need not be provided. However, for manufacturing small parts, it may be necessary to have a very high resolution projection system, in which case it may be more practical to provide a moving projection unit 160 as shown and described in relation to FIGS. 1 to 6.

Referring to FIG. 4, projection unit 160 may illuminate substantially all of shot area S with radiation R simultaneously, or at least may provide radiation to various dispersed positions within shot area R simultaneously, effectively applying a pattern image to shot area R. Figure shows the internal configuration of projection unit 160 which may allow such simultaneous illumination of a shot area S.

Figure 7:
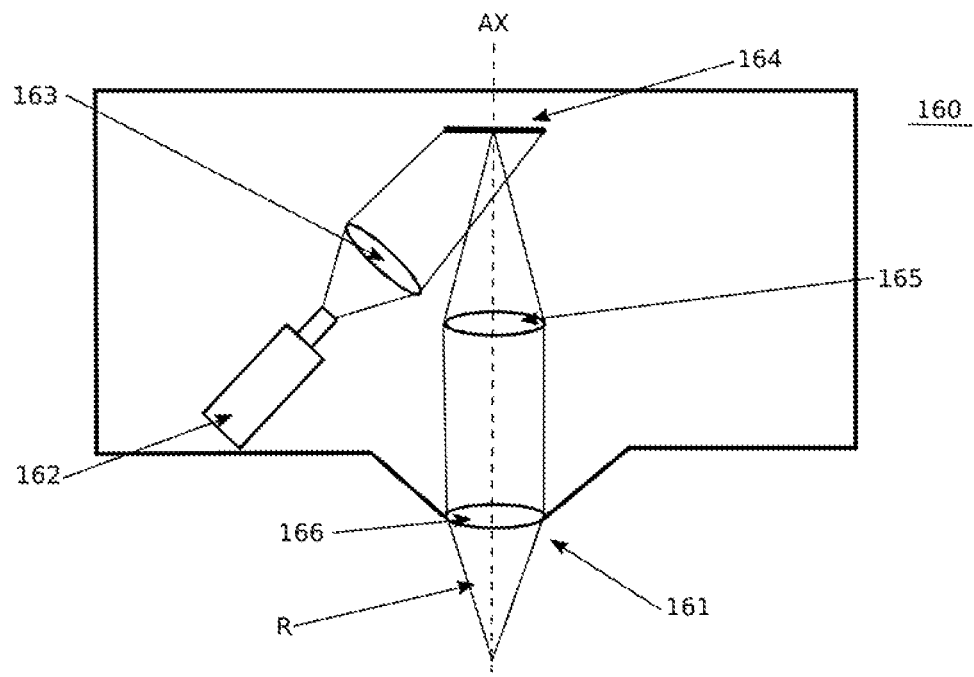
FIG. 7 shows a first configuration of a projection unit suitable for use in the apparatus of FIG. 1.

In FIG. 7, projection unit 160 comprises illumination source 162 which generates radiation R of an appropriate characteristic, such as energy, wavelength and/or intensity, to cure material M forming layer L. Illumination source 162' may be, for example, a laser or light emitting diode (LED), and in particular may be an ultraviolet laser or ultraviolet light emitting diode (LED). For electron beam radiation, illumination source may be an electron beam generator. Radiation R from illumination source 162 is shaped by shaping lens 163 to form a collimated beam, which illuminates spatial light modulator 164.

Spatial light modulator 164 acts a patterning element to define a pattern of illuminated and non-illuminated regions. For example, spatial light modulator may provide a matrix of moveable mirrors, which moveable mirrors are movable between a first orientation and a second orientation, the first orientation deflecting radiation R from illumination source 162 at a large angle to an optical axis AX of projection unit 160 and another direction in which radiation is directed along or at a small angle to optical axis AX. However, other varieties of spatial light modulator, such as those using a variable transmission mask, are also known in the art for patterning radiation beams, and may also be applied in the disclosed configuration.

Radiation R directed at a small angle to optical axis AX is captured by a first projection optical element 165, which guides the radiation R through final projection element 166. Final projection element 166 is arranged in projection aperture 161 to form an image of the spatial light modulator 164 at layer L.

Spatial light modulator 164 therefore defines a pattern or an image which is transferred by projection optics, which include the first projection element 165 and final projection element 166, onto layer L. However, the precise structure of projection optics is exemplary only, and other optical arrangements are possible which allow an image to be defined by spatial light modulator 164 and then projected onto a plane, as will be well understood by those skilled in the art.

Projection unit 160 can accordingly be implemented as a digital light processor (DLP).

When charged electromagnetic radiation, such as ultraviolet radiation or visible light radiation, is used, the concepts of projection unit 160 shown in FIG. 7 may be adopted. In particular, ultraviolet radiation or visible light radiation is easily reflected by mirror surfaces, and therefore ultraviolet or visible light radiation is easily patterned by a spatial light modulator comprising movable mirrors.

Figure 8:
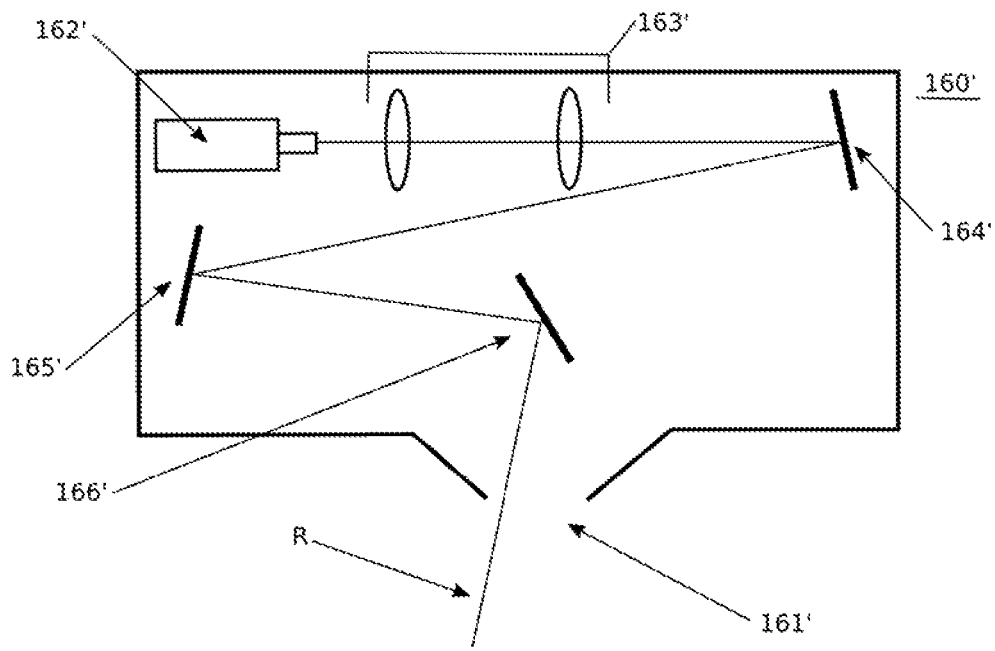
FIG. 8 shows an alternative variant of a projection unit suitable for use in the apparatus of FIG. 1.

However, with reference to FIG. 8, an alternative type of projection unit 160' may be used in place of projection unit 160. Projection unit 160' also includes an illumination source 162' which generates a radiation beam R. Illumination source 162' generates radiation which is shaped by beam shaping optics 163' to provide a collimated beam of narrow diameter. For example, beam shaping optics 163' may take the output of illumination source 162' and may generate a radiation beam R of circular or Gaussian form. Such a beam may be, for example, less than 10 micron in diameter or less than 1 micron in diameter.

Radiation beam R is then brought by the action of folding mirror 164' onto first steering mirror 165', which deflects the beam in a first direction at a variable angle, so as to scan the beam around a first axis. First steering mirror 165' may be, for example, a galvanometer scanner. The beam from first steering mirror 165' is then brought to second steering mirror 166', which deflects the radiation beam R about a second axis, which may be perpendicular to first axis of first steering mirror 165'. Second steering mirror 166' may also be a galvanometer scanner. Radiation beam R is then directed through aperture 161', before beam R is applied to layer L.

Using the configuration of projection unit 160', radiation beam R is not able to illuminate the entirety of shot region S at a single time, but rather may be directed to any point within shot area S at successive times. Radiation beam R may thus scan over shot area S, for example in a raster fashion, progressively scanning row by row under the guidance of the first steering mirror 164' and second steering mirror 165'. With a beam scanning in a raster fashion over shot region S, to selectively illuminate portions of layer L in shot area, illumination source 162' may itself be pulsed as the beam is scanned. Alternatively, folding mirror 164' may be switchable between a first position at which the beam is directed to first steering mirror 165' and a second position where the beam is directed away from first steering mirror 165', thereby to interrupt selectively the radiation beam R.

In a variant configuration, the beam is steerable to define a vector, rather than a raster, pattern on layer L.

When charged particle radiation, such as electron beam radiation, is used, the concepts of projection unit 160' shown in FIG. 8 may be adopted. In particular, electron beam radiation is easily deflected by magnetic fields, and therefore electron beam radiation is easily scanned across a projection region.

The configurations of FIG. 7 and FIG. 8 are exemplary, and other approaches to selectively illuminating portions of a layer with a projection unit are available within the art.

Figure 9A:
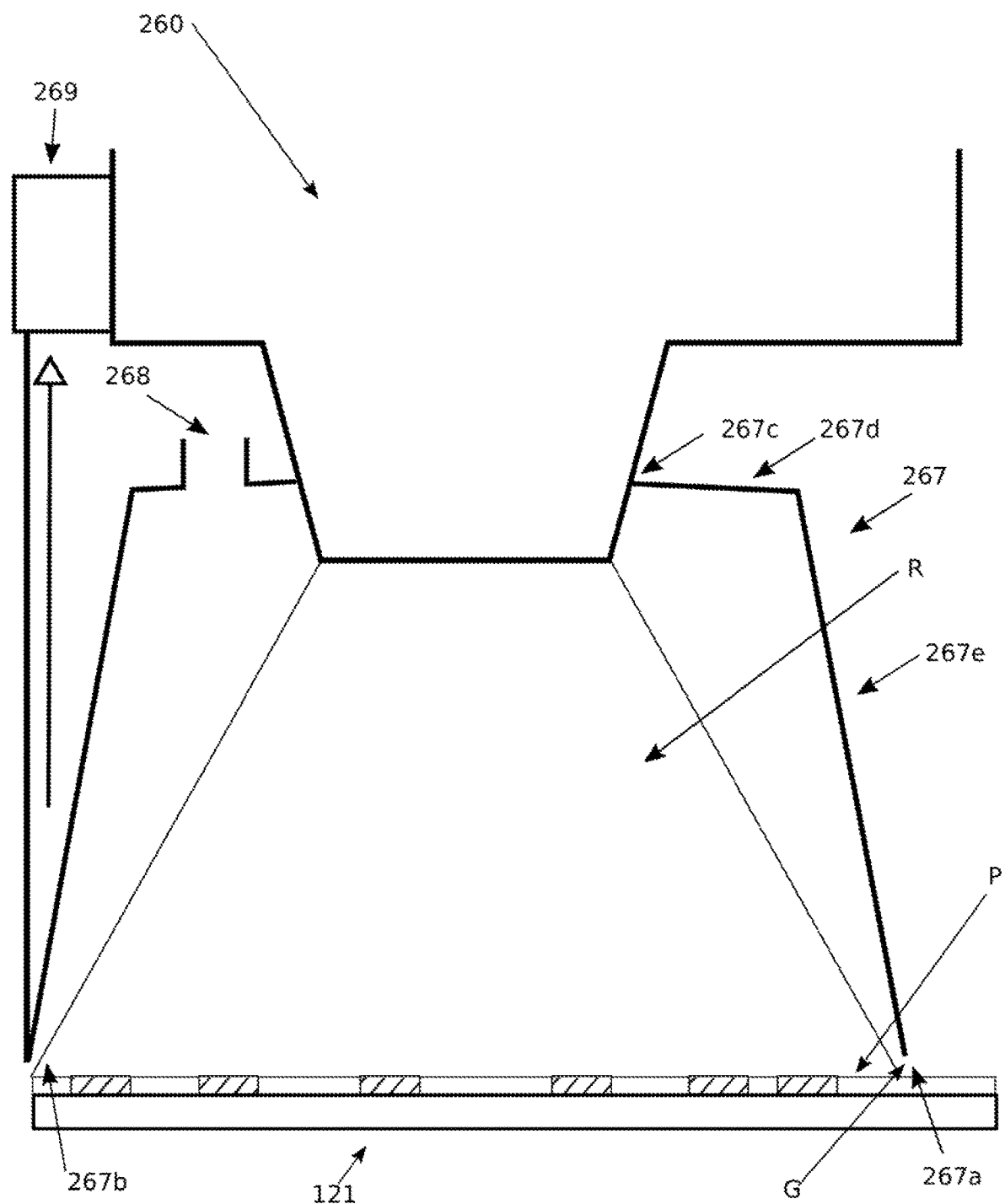
FIG. 9A shows a variant of the projection unit of FIG. 6 having a gas hood.

FIG. 9A shows a variant embodiment, based on the configuration of FIG. 4, in which the projection unit 260, which may operate according to the principles of FIG. 7 or FIG. 8, for example, is provided with a gas hood 267. Gas hood 267 is a cup-like member which is positionable to surround at least a part of radiation beam R projected by projection unit 260.

Gas hood 267 is positionable such that a small gap G, of typically between 1 cm and 1 mm, exists between a lower surface 267a of hood and the deposited layer L.

Gas hood 267 has a lower opening 267b bordered by lower surface 267a. Gas hood 267 also has an upper opening 267c bordered by an upper surface 267d of gas hood 267. Lower opening 267b is appropriately shaped and dimensioned to surround a region above the entirety of the intended projection region of the radiation beam R. Upper opening 267a is in the present embodiment shaped and dimensioned to surround at least a portion of projection unit 260. Upper opening 267a may, for example, fit snugly or seal against part of projection unit 260. Accordingly, gas hood 267 encloses substantially the whole radiation beam R between projection unit 267 and layer L.

Similarly to gas supply unit 170, gas hood 267 is connected to a gas supply (not shown) which may be provided in the apparatus or which may be provided as a service to the apparatus, for example as a compressed air line or dry nitrogen line provided at the facility in which the apparatus is installed. Gas hood 267 has one or more gas supply ports 268 which allow a gas to be supplied from the gas supply to an interior of the hood 267. Each gas supply port 268 may be provided with a porous member (not shown), such as a porous ceramic plate, to diffuse the flow of gas. Such a configuration may avoid turbulent flow within the hood which may disturb the material of the layer.

Gas hood 267 may be arranged in a fixed configuration to a body of projection unit 260, or may be retractable. In the present embodiment, gas hood 267 is retractable. In particular, gas hood 267 may be retracted by retraction unit 269 arranged between a body of projection unit 260 and gas hood 267. Here, retraction unit 269 is a unit which is connected, for example, by a rod or cable to a lower end of gas hood 267, and which by applying an upward force on the lower end of gas hood 267 raises lower surface 267a of gas hood 267 vertically from layer L, along the direction of the unlabelled arrow in FIG. 9A. In this embodiment, a top of gas hood 267 is attached to projection unit 260, and at least side walls 367e of gas hood 267 are of a flexible or bellows construction, so that the gas hood 267 may be retracted to a compact state from the extended state shown in FIG. 9A. Other configurations for retracting gas hood 267 are possible.

Retraction unit 267 may be actuated to raise gas hood 267 away from layer L so that slot die 110 can pass beneath. Therefore, it is possible to avoid mechanical interference between gas hood 267 and slot die 110 as slot die 110 passes between projection unit 260 and build platform 121.

In alternative configurations, the whole projection unit 260 may be retractable to avoid interference between gas hood 267, or gas hood 267 may not be flexible or of bellow construction, but may be rigid and retracted by lifting from beneath projection unit 260.

When gas, optionally cool gas, and also optionally non-oxygenated or inert gas, such as nitrogen, is introduced via gas ports 268 to an interior to gas supply hood, improved curing behaviour of layer L can be obtained when radiation beam R is applied. In particular, certain radiation-curable polymers cure more evenly and reproducibly in the absence of free oxygen. Accordingly, distortions in curing can be avoided, and an occurrence of incomplete or excessive cure can be reduced. Also, since the curing process can heat the layer L, a cooling gas flow introduced through ports 268 is able to remove excess heat from the layer L.

Figure 9B:
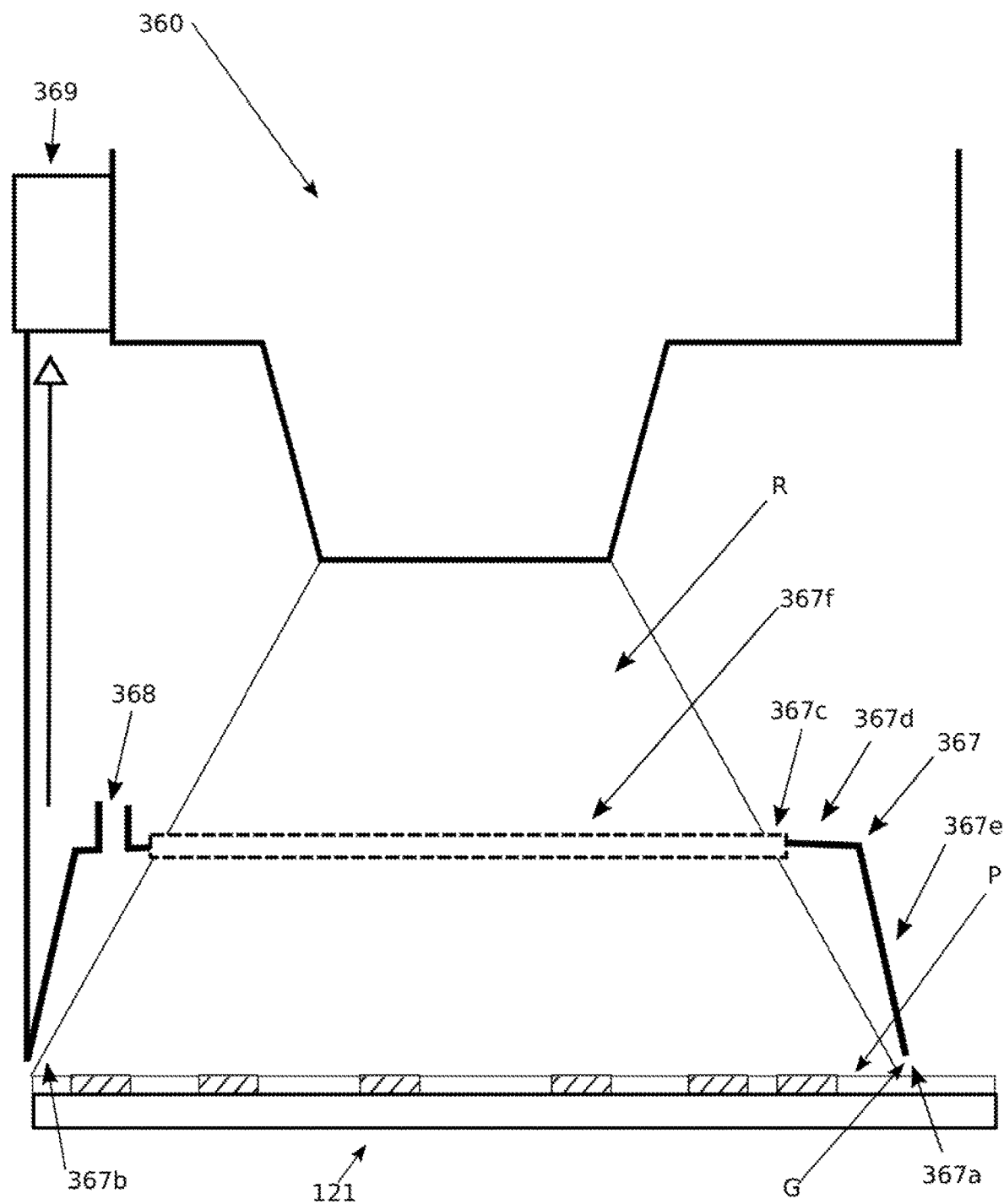
FIG. 9B shows a further variant of the projection unit of FIG. 6 having a gas hood.

FIG. 9B shows a further variant embodiment, based on the configuration of FIG. 9A, in which the projection unit 360 is provided with an alternative configuration of gas hood 367. Gas hood 367 is similar to gas hood 267 shown in FIG. 9A, being a cup-like member which is positionable to surround at least a part of radiation beam R projected by projection unit 360. As for gas hood 267 shown in FIG. 9A, gas hood 367 has one or more gas supply ports 368 which allow a gas to be supplied from the gas supply to an interior of the hood 367.

However, gas hood 367 is shorter between lower and upper surfaces than gas hood 267 shown in FIG. 9A, and thus only surrounds a lower part of radiation beam R. Gas hood 367 has a lower opening 367b bordered by lower surface 367a to allow radiation beam R and the gas in the gas hood to reach layer L. Gas hood 367 also has an upper opening 367c bordered by an upper surface 367d of gas hood 367. Lower opening 367b is appropriately shaped and dimensioned to surround a region above the entirety of the intended projection region. Upper opening 367a is in the present embodiment shaped and dimensioned to permit radiation beam R to pass.

Also, upper opening 367a is in the present embodiment provided with a radiation-transparent member 367f to allow radiation beam R to pass, while avoiding the escape of gas from within the hood. For example, radiation-transparent member 367f is here shown as a transparent plate, such as a quartz or fluorite plate.

In other embodiments, if the escape of gas is not considered a problem, the opening 367c can remain unblocked. Alternatively, no opening 367c can be present, and instead the whole gas hood 367, or an appropriate portion, such as upper surface 367d of the gas hood 367, can be made transparent to radiation. For example, gas hood 367 may be made of quartz or fluorite, or may have a quartz or fluorite upper portion or lid.

In contrast to gas hood 267, gas hood 367 is suspended with a small gap G above layer L via retraction unit 369 which is arranged between a body of projection unit 360 and gas hood 367. As for gas hood 267, for gas hood 267, gap G may be of typically between 1 cm and 1 mm. Retraction unit 369 may be actuated to raise the whole of gas hood 367 away from layer L so that slot die 110 can pass beneath. In this configuration, gas hood 367 need not be partially or wholly flexible or have a bellows construction, but may be rigid.

In FIG. 9B, gas hood 367 is supported by projection unit 260, but in variant embodiments gas hood 367 may be separately supported by another member. For example, a similar mechanism to projection unit drive section 190 may be provided for introducing and removing gas hood 367 above the intended projection region at an appropriate time.

As in the configuration of FIG. 9A, it is possible to avoid mechanical interference between gas hood 267 and slot die 110 as slot die 110 passes between projection unit 260 and build platform 121.

Accordingly, by depositing a layer of radiation-curable material using slot die 110 and then by successively curing selectively portions of that layer with projection unit 160, and by repeating this process such than an object is built up layer by layer, portions of each layer being joined together and being joined with portions of the underlying layer, an entire object can be built up. Using the disclosed configurations, disturbance of uncured material in lower layers is avoided even while depositing an upper layer.

Additionally, by using a projection unit 160 for defining a pattern of bound regions within a deposited layer L, multiple exposure techniques can be employed to reduce deformation. In particular, when a large area of a layer L is cured together, the cured portions may tend to shrink or swell, leading to distortions. Accordingly, an approach may be adopted wherein, rather than a single exposure of a shot area, multiple exposures of a single shot area may be performed in which an overall connected pattern within a shot area is built up from a sequence of images which, when superimposed, form the connected structure. This approach may have advantage of reducing overall distortions.

Figure 10A:
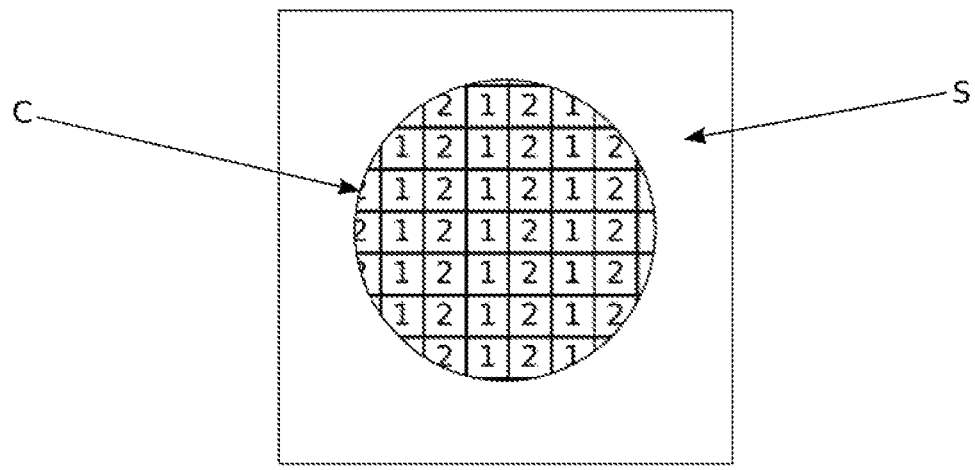
FIG. 10A shows a first mode of superposition of patterns in a shot area.

For example, if a circular area C is to be cured within a shot area S, as shown in FIG. 10A, a checkerboard pattern, for example, can be defined within circle C, and then even-numbered squares 1 of the checkerboard pattern may be first illuminated in a first partial exposure, and then odd-numbered squares 2 of the checkerboard may be exposed in a second partial exposure superimposed on the first partial exposure. The curing of the odd-numbered squares 2 connects the previously-cured material in the even-numbered squares together. In some situations, the squares of the checkboard pattern may correspond to pixels of an overall image to be image projected via projection until 160. Also, by applying such an approach, the overall degree of shrinkage and the total resulting forces within a layer due to curing may be reduced or eliminated. This may reduce distortion compared with curing the entirety of circle C in a single exposure.

Figure 10B:
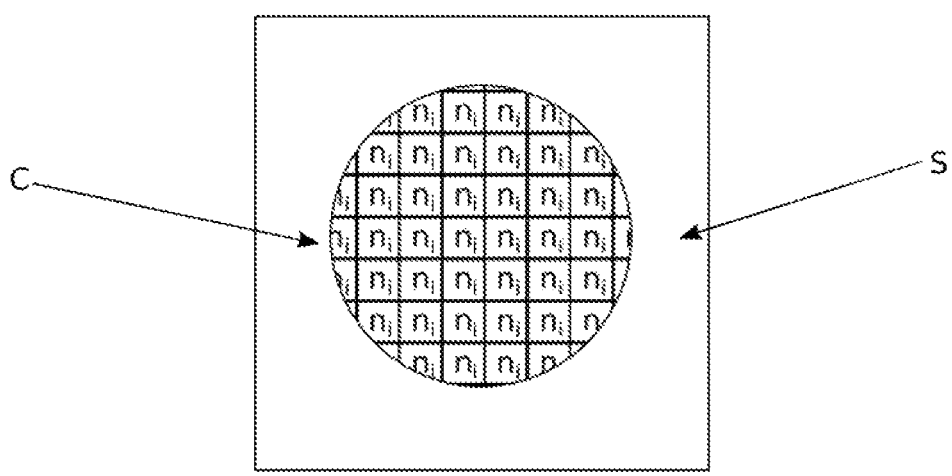
FIG. 10B shows a second mode of superposition of patterns in a shot area.

In another approach, shown in FIG. 10B, several images are superimposed, each of which contains a pseudorandom subset of the pixels $n_i$ defining circle C. Other approaches are possible. Also by this approach, the overall degree of shrinkage and the total resulting forces within a layer due to curing may be reduced or eliminated, and distortion may be reduced.

Figure 11:
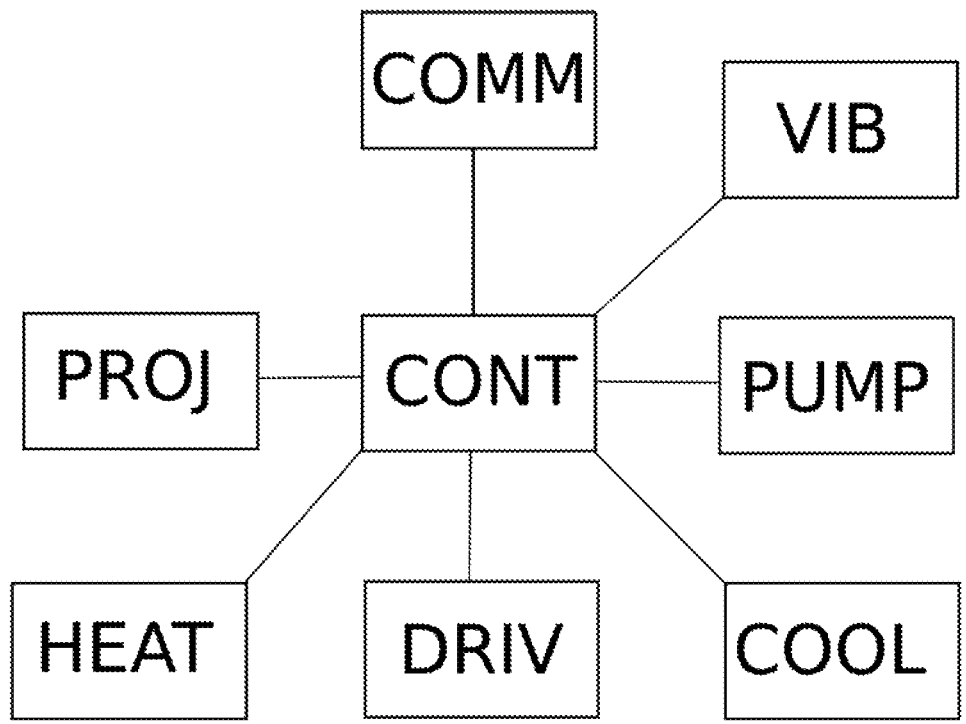
FIG. 11 shows a block diagram showing the control arrangement of the apparatus of FIG. 1.

FIG. 911 shows a control schematic showing overall control of the apparatus 100. The control schematic shown in FIG. 11 may be provided as discrete hardware, or may be provided as integrated or discrete software modules within an overall industrial control system or microcomputer.

Overall system control unit CONT receives instructions concerning the operation of apparatus 100 via communications interface COMM. Communications link COMM may be a network link to a client computer containing instructions for the operation of apparatus 100, which may include, for example, object definition data defining an object, for example, as a series of layers L to be deposited and then bound selectively in sequence according to the object definition data. Object definition data may, for example be sequence of images, or may alternatively be voxel data or another form of object definition data may be known in the art. Alternatively, communication link COMM may be a bus connected to an interactive input/output device providing an interactive apparatus control session to a user. Alternatively, communications link COMM may be a link with local storage or an industrial controller providing instructions for operation of apparatus 100. These instructions may together form, for example, a recipe defining a sequence of operations to be performed.

Control unit CONT is connected to projection controller PROJ, which controls projection unit drive section 190 as well as projection unit 160. Accordingly, projection control unit PROJ controls the position of projection unit 160 as well as the pattern to be projected to any given shot area S, as well as, for example, other aspects of the operation of projection unit 160 such as the exposure time, scan rate where appropriate, radiation wavelength or energy where appropriate, radiation beam dimensions and shape, and other radiation characteristics. Also, projection controller PROJ may be configured to break a large image to be projected into a series of smaller images to be partially superimposed for a step-and-stitch approach as shown in FIG. 6, or may break a shot area S into a succession of partial images to be superimposed one on top of another as described with reference to FIGS. 10A and 10B.

Control unit CONT also is connected to pump controller PUMP, which controls the operation of the pump (not shown) in terms of, for example, mass flow rate of material delivered to slot die 110 or pressure obtained either internal to the pump or internal to slot die cavity 113.

Control unit CONT also connects to slot die drive controller DRIVE which controls slot die carriage drive section 150 to position slot die 110 in a movement direction.

Control unit CONT may coordinate the operation of pump controller PUMP and slot die drive controller DRIVE so as to achieve a correspondence between extrusion rates of material M and movement speed of slot die 110 as explained in connection with FIG. 3.

Control unit CONT is also connected to heater controller HEAT, vibration controller VIB and cooling controller COOL which respectively control slot die heating elements 117, slot die vibrator 118a, and platform cooling elements 126 and well cooling elements 125 as well as gas supply unit 170 to achieve appropriate process parameters for layer deposition.

Figure 12:
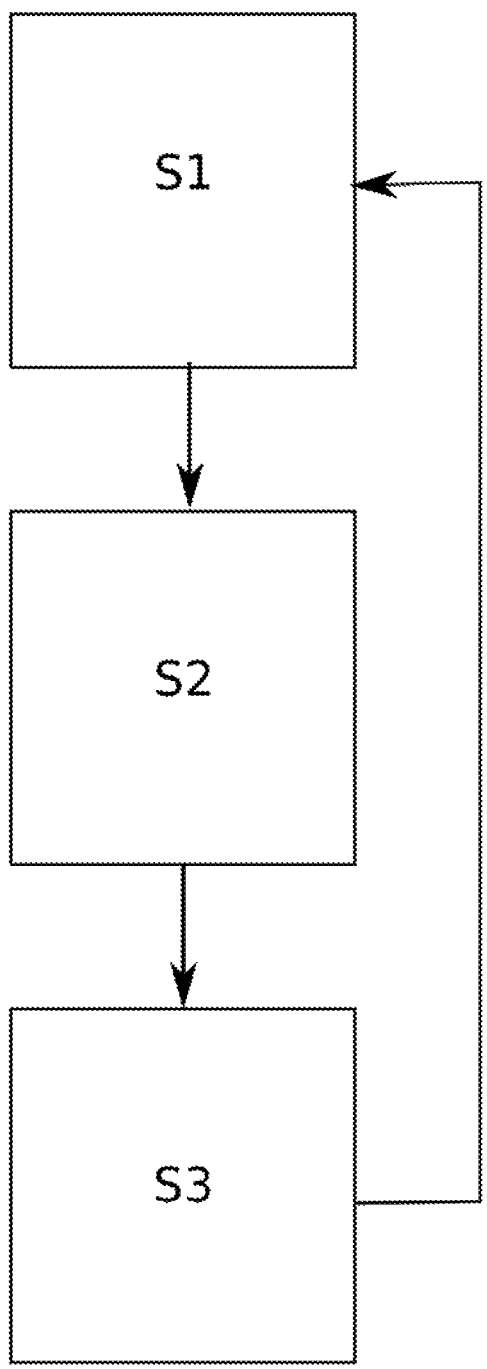
FIG. 12 shows a flowchart illustrating an additive manufacturing method in accordance with the present disclosure.

A flowchart for the operation of the apparatus of FIG. 100 is shown in FIG. 12, and is described as follows.

In a layer deposition step S1, a radiation-curable construction material is extruded above a support surface with a slot die while relatively moving the slot die above and across the support surface in a movement direction to deposit a layer of extruded construction material above the support surface, as explained in connection with FIGS. 1 to 3.

In a curing step S2, radiation is selectively projected to a construction region between the support surface and the slot die, thereby curing portions of the extruded construction material to define regions of the extruded layer forming part of the object, as explained in connection with FIGS. 4 to 8 and 10.

In a separation step S3, the slot die and the support surface are moved in a separation direction between the slot die and the support surface, as explained in connection with FIGS. 1 to 3.

Steps S1 to S3 are repeated until a desired object is formed by the contiguous cured portions of the construction material extending across and between the layers.

This apparatus and method is particularly applicable to the deposition of a suspension of powder particles of a metal or ceramic. Particularly, the apparatus and method is applicable to a carbide, oxide or nitride ceramic dispersed within a curable, particularly ultraviolet-curable or electron-beam-curable liquid phase. One exemplary suspension is suspension of such particles within a liquid mixture of monomers and/or oligomers, optionally containing photoinitiators, which cure to form a polymer. Such suspensions are often highly viscous and difficult to handle via traditional liquid deposition means. In the suspension, the particles may have a mean diameter of less than 5 microns, or even less than 2 microns. Adopting such a material as the construction material can provide a method and apparatus which can form cured objects which can be subsequently sintered together to provide a metal or ceramic part, in which much or substantially all of the curable binder is removed or degraded during the sintering process. When the powder particles are ceramic particles, other examples of ceramics can alternatively be used, for example borides and silicates, without limitation.

This approach has an advantage that the uncured liquid can simply be removed and reused, while the cured object can, in principle, be removed from the liquid and, after cleaning, be immediately placed in service.

The above disclosure is purely exemplary, and may be modified by those skilled in the art in accordance with local requirements and engineering practice, as well as availability of materials and parts. Accordingly, the invention is considered to be defined solely by the spirit and scope of the appended claims.

The invention claimed is:

1. An additive manufacturing apparatus, the apparatus comprising:
   a support surface;
   a slot die having an internal cavity communicating with a slot formed in a lower surface of the slot die, the slot die being an extrusion die through which a construction material is extruded by passing through the chamber and out of the slot;
   a carriage supporting the slot die and arranged to allow movement of the slot die across and above the support surface in a movement direction;
   a drive mechanism arranged to drive the movement of the carriage in the movement direction;
   a projection unit for selectively projecting radiation to a construction region between the support surface and the slot die; and
   a controller configured to control at least the drive mechanism,
   wherein the slot die and the support surface are relatively moveable in a separation direction between the slot die and the support surface,
   wherein the slot is defined by two slot halves, and the slot die is provided with a vibrator configured to vibrate the edges of the slot relative to one another.

2. The apparatus according to claim 1, wherein the slot die is provided with a heating unit for heating at least a portion of the slot die which defines the slot.

3. The apparatus according to claim 1, wherein the apparatus is provided with a cooling unit for removing heat from the construction region.

4. The apparatus according to claim 3, wherein the cooling unit comprises at least one gas supply port connectable to a gas source and arranged to blow the gas towards the construction region.

5. The apparatus according to claim 1, wherein the slot is oriented in a slot orientation direction, and the movement direction is perpendicular to the slot orientation direction.

6. The apparatus according to claim 1, wherein the separation direction is perpendicular to each of the slot orientation direction and the movement direction.

7. The apparatus according to claim 1, wherein the support surface is flat and defines a plane perpendicular to the separation direction.

8. The apparatus according to claim 7, wherein the plane is parallel to the slot orientation direction and the movement direction.

9. The apparatus according to claim 1, wherein the apparatus comprises a pump connectable to a reservoir of construction material and the slot die has an inlet port connected to the pump.

10. The apparatus according to claim 9, wherein the controller is configured to control the pump to cause construction material to be extruded at a predetermined rate.

11. The apparatus according to claim 1, wherein the controller is configured to control the volume rate of extrusion and the rate of movement of the carriage in proportionality with one another.

12. The apparatus according to claim 1, wherein the controller is configured to control the linear rate of extrusion and the rate of movement of the carriage to be equal to one another.

13. The apparatus according to claim 1, wherein the projection unit comprises a radiation source for generating a radiation beam, a patterning unit illuminated by the radiation beam for patterning the radiation beam, and projection optics for projecting an image of the pattern onto a plane defined between the support surface and the slot die to selectively apply radiation to the plane.

14. The apparatus according to claim 13, wherein the patterning unit is a spatial light modulator.

15. The apparatus according to claim 14, wherein the patterning unit is a digital light processor.

16. The apparatus according to claim 1, wherein the projection unit comprises a radiation source for generating a radiation beam and scanning optics for scanning the radiation beam across a plane defined between the support surface and the slot die to selectively apply radiation to the plane.

17. The apparatus according to claim 16, wherein the radiation beam is an intermittent radiation beam and the scanning so as to selectively apply radiation to the plane as a raster image.

18. The apparatus according to claim 16, wherein the scanning is so as to selectively apply radiation to the plane as a vector image.

19. The apparatus according to claim 16, wherein the radiation beam is an electron beam.

20. The apparatus according to claim 1, wherein the radiation is ultraviolet light radiation or visible light radiation.

21. The apparatus according to claim 1, wherein the apparatus comprises a well and an elevator mechanism, and the support surface is movable in the separation direction into the well by means of the elevator mechanism.

22. The apparatus according to claim 21, wherein the well has an internal wall, and the support surface is provided with an edge seal to seal against the internal wall.

23. The apparatus according to claim 21, wherein a top of the well is surrounded by an inclined surface which is inclined downward away from the top of the well.

24. The apparatus according to claim 21, wherein the well is provided with one or more cooling elements for cooling the walls of the well.

25. The apparatus according to claim 1, wherein the support surface is provided with one or more cooling elements for removing heat from the support surface.

26. The apparatus according to claim 25, wherein the one or more cooling elements comprises channels connectable to a coolant source and arranged to carry a coolant.

27. The apparatus according to any claim 25, wherein the one or more cooling elements comprises a thermoelectric cooler.

28. The apparatus according to claim 1, wherein the well has a constant cross-section and the support surface has a shape corresponding to the cross-section of the well.

29. The apparatus according to claim 1, wherein the well is rectangular in cross-section.

30. The apparatus according to claim 1, wherein the control unit is configured to control the projection unit in accordance with the drive mechanism to project a series of different partial images at different times across the support surface, each partial image overlapping with one or more other partial images.

31. The apparatus according to claim 1, wherein the control unit is configured to control the projection unit such that each partial image comprises isolated pixels, and such that the isolated pixels are connected by other partial images of the plurality of partial images when the partial images are overlapped.

32. The apparatus according to claim 1, wherein the control unit is configured to control the projection unit such that each of the partial images has a pattern which combines with one or more patterns of the remainder of the plurality of images to form a uniformly irradiated area.

33. The apparatus of claim 32, wherein the pattern is a pseudorandom pattern.

34. The apparatus of claim 32, wherein the pattern is a checkerboard pattern.

35. The apparatus of claim 1, wherein the construction material is a suspension of a particulate material in a radiation-curable liquid medium.

36. The apparatus of claim 35, wherein the liquid medium is polymerizable.

37. The apparatus of claim 35, wherein the particulate material is a ceramic, optionally a nitride, oxide or carbide ceramic.

38. The apparatus of claim 35, wherein the particulate material is a metal powder.

39. The apparatus of claim 35, wherein the particulate material has a mean diameter of less than 5 micron, optionally less than 2 micron.

40. The apparatus of claim 35, wherein the radiation-curable liquid medium is ultraviolet light curable or visible light curable.

41. The apparatus of claim 35, wherein the radiation-curable liquid medium is electron-beam-curable.

42. The apparatus of claim 1, wherein the projection unit is configured to project images with a resolution of better than 10 micron.

43. The apparatus of claim 1, wherein the projection unit is supported by a further carriage, which further carriage is arranged to allow movement of a projection position of the projection unit across and above the support surface in the movement direction and a cross direction which is perpendicular to the movement direction, and the apparatus comprises a further drive mechanism arranged to drive the movement of the further carriage in the movement direction and the cross direction.

44. The apparatus according to claim 1, further comprising a gas hood for supplying a gas to a projection region of the projection unit.

45. The apparatus according to claim 44, wherein the gas hood is suspended from the projection unit.

46. The apparatus according to claim 44, wherein the gas hood is retractable away from the support surface.

47. The apparatus according to claim 44, wherein the gas hood is arranged to substantially surround at least a portion of the radiation projected from the projection unit.

48. The apparatus according to claim 44, wherein the gas hood has a lower opening arranged to face the projection region.

49. The apparatus according to claim 44, wherein the gas hood has an upper opening for allowing the radiation projected from the projection unit to pass.

50. The apparatus according to claim 49, wherein the upper opening is provided with a radiation-transparent plate.

51. The apparatus according to claim 44, wherein an upper portion of the gas hood is radiation transparent for allowing the radiation projected from the projection unit to pass.

52. The apparatus according to claim 44, wherein the gas hood is configured to supply an inert gas.

53. The apparatus according to claim 44, wherein the gas hood is configured to supply a cooling gas.

54. A method of forming an object from sequentially deposited layers of a construction material, the method comprising repeatedly:
   providing an additive manufacturing apparatus, the apparatus comprising:
     a support surface;
     a slot die having an internal cavity communicating with a slot formed in a lower surface of the slot die;
     a carriage supporting the slot die and arranged to allow movement of the slot die across and above the support surface in a movement direction;
     a drive mechanism arranged to drive the movement of the carriage in the movement direction;
     a projection unit for selectively projecting radiation to a construction region between the support surface and the slot die; and
     a controller configured to control at least the drive mechanism,
     wherein the slot die and the support surface are relatively moveable in a separation direction between the slot die and the support surface,
     wherein the slot is defined by two slot halves, and the slot die is provided with a vibrator configured to vibrate the edges of the slot relative to one another;
   extruding the construction material above the support surface with the slot die while relatively moving the slot die above and across the support surface in the movement direction to deposit a layer of extruded construction material above the support surface;
   selectively projecting radiation to the construction region between the support surface and the slot die, thereby curing portions of the extruded construction material to define regions of the extruded layer forming part of the object;
   relatively moving the slot die and the support surface in the separation direction between the slot die and the support surface; and
   vibrating the edges of the slot relative to one another.

55. The method of claim 54, wherein the construction material is a suspension of a particulate material in a radiation-curable liquid medium.

56. The method of claim 55, wherein the particulate material is a ceramic or a metal powder.

57. The method of claim 55, wherein the liquid medium is radiation-curable to form a polymer.

58. The method of claim 55, wherein the particulate material has a mean diameter of less than 5 micron, optionally less than 2 micron.

59. The method of claim 54, wherein the radiation is ultraviolet light radiation, visible light radiation or electron beam radiation.

* * * * *